US012540826B2

(12) United States Patent
Shihoya et al.

(10) Patent No.: US 12,540,826 B2
(45) Date of Patent: Feb. 3, 2026

(54) LOCATION INFORMATION PROCESSING DEVICES, METHODS, AND SYSTEMS FOR MOVING BODIES

(71) Applicant: MICWARE CO., LTD, Kobe (JP)

(72) Inventors: Kaori Shihoya, Kobe (JP); Hiroyuki Kitagawa, Kariya (JP)

(73) Assignee: MICWARE CO., LTD, Kobe (JP)

( * ) Notice: Subject to any disclaimer, the term of this patent is extended or adjusted under 35 U.S.C. 154(b) by 590 days.

(21) Appl. No.: 17/275,552

(22) PCT Filed: Aug. 22, 2019

(86) PCT No.: PCT/JP2019/032754
§ 371 (c)(1),
(2) Date: Mar. 11, 2021

(87) PCT Pub. No.: WO2020/054341
PCT Pub. Date: Mar. 19, 2020

(65) Prior Publication Data
US 2022/0090929 A1    Mar. 24, 2022

(30) Foreign Application Priority Data
Sep. 14, 2018 (JP) .................. 2018-172779

(51) Int. Cl.
*G01C 21/34* (2006.01)
*G01C 21/30* (2006.01)
*G08G 1/01* (2006.01)

(52) U.S. Cl.
CPC ......... *G01C 21/3492* (2013.01); *G01C 21/30* (2013.01); *G08G 1/0112* (2013.01); *G08G 1/0129* (2013.01)

(58) Field of Classification Search
CPC .. G01C 21/3492; G01C 21/30; G08G 1/0112; G08G 1/0129
See application file for complete search history.

(56) References Cited

U.S. PATENT DOCUMENTS 8,718,932 B1 * 5/2014 Pack ................. G01C 21/30
701/446
2006/0276961 A1   12/2006 Kwon
(Continued)

FOREIGN PATENT DOCUMENTS

CA       3052251 A1    8/2018
CN       1873375 A     12/2006
(Continued)

OTHER PUBLICATIONS

Extended European Search Report, dated May 17, 2022, issued in corresponding European Patent Application No. 19859320.4.
(Continued)

*Primary Examiner* — Scott A Browne
*Assistant Examiner* — Rami Nabih Bedewi
(74) *Attorney, Agent, or Firm* — Foley & Lardner LLP

(57) ABSTRACT

An information processing device performs information processing on position coordinates of a moving body. The information processing device includes a storage and a controller. The storage stores travel history information including a series of position coordinates indicative of a travel history of the moving body. The controller performs map matching that corrects the position coordinates onto a road network of map information. The controller calculates a plurality of candidate coordinate sequences in which position coordinates as a result of the map matching are arranged, based on the travel history information stored in the storage. The controller generates position data indicative of a position where the moving body was traveling, based on the plurality of candidate coordinate sequences.

10 Claims, 16 Drawing Sheets

(56) References Cited

U.S. PATENT DOCUMENTS

| | | | |
|---|---|---|---|
| 2008/0228395 A1* | 9/2008 | Kobori | G01S 5/011 |
| | | | 701/8 |
| 2017/0097642 A1* | 4/2017 | Okuya | G05D 1/0212 |
| 2019/0186926 A1* | 6/2019 | Koponen | G01C 21/30 |
| 2019/0391594 A1 | 12/2019 | Takano et al. | |
| 2020/0204956 A1* | 6/2020 | Li | H04W 4/027 |

FOREIGN PATENT DOCUMENTS

| | | |
|---|---|---|
| CN | 102879003 A | 1/2013 |
| CN | 104034337 A | 9/2014 |
| EP | 1 783 722 A1 | 5/2007 |
| JP | 08-068656 A | 3/1996 |
| JP | 2006-071627 A | 3/2006 |
| JP | 2007-179373 A | 7/2007 |
| JP | 2016-071442 A | 5/2016 |
| JP | 2016-138812 A | 8/2016 |
| WO | WO-2018/142527 A1 | 8/2018 |

OTHER PUBLICATIONS

Japanese Office Action, dated Jul. 5, 2022, issued in corresponding Japanese Patent Application No. JP2018-172779.
Office Action and Search Report issued in corresponding Chinese Patent Application No. 201980059980.3, dated Jul. 29, 2023.
International Searching Authority, "International Search Report," issued in connection with International Patent Application No. PCT/JP2019/032754, dated Nov. 26, 2019.
International Preliminary Report on Patentability from PCT/JP2019/032754 dated Mar. 25, 2021 (6 pages).
Office Action issued in corresponding Chinese Patent Application No. 201980059980.3 dated Dec. 17, 2023 (15 pages).

* cited by examiner

Fig.7

| INDEX FILE | | | | |
|---|---|---|---|---|
| GPS INFO. INDEX | MOVEMENT INFO. INDEX | GPS CORDINATE | | DR AZIMUTH |
| | | LONGITUDE | LATITUDE | |
| 1 | 1 | XXX. X | XXX. Y | xxx. x |
| 1 | 2 | XXX. X | XXX. Y | xxx. y |
| 1 | 3 | XXX. X | XXX. Y | xxx. z |
| 1 | 4 | XXX. X | XXX. Y | xxy. x |
| 1 | 5 | XXX. X | XXX. Y | xxy. y |
| 2 | 6 | XXX. Z | XXY. X | xxy. z |
| 2 | 7 | XXX. Z | XXY. X | xxz. x |
| 2 | 8 | XXX. Z | XXY. X | xxz. y |
| 2 | 9 | XXX. Z | XXY. X | xxz. z |
| 2 | 10 | XXX. Z | XXY. X | xyx. x |
| ⋮ | ⋮ | ⋮ | ⋮ | ⋮ |

Fig.8

| CANDIDATE COORDINATE SEQUENCE FILE | | | |
|---|---|---|---|
| GPS INFO. INDEX | MOVEMENT INFO. INDEX | CANDIDATE COORDINATE | |
| | | LONGITUDE | LATITUDE |
| 1 | 1 | XXY. Y | XXY. Z |
| 2 | 6 | XXZ. X | XXZ. Y |
| 3 | 11 | XXZ. Z | XYX. X |
| 4 | 16 | XYX. Y | XYX. Z |
| 5 | 21 | XYY. X | XYY. Y |
| ⋮ | ⋮ | ⋮ | ⋮ |
| 19 | 75 | XYY. Z | XYZ. X |
| 20 | 81 | XYZ. Y | XYZ. Z | ial
LOCATION INFORMATION PROCESSING DEVICES, METHODS, AND SYSTEMS FOR MOVING BODIES

CROSS-REFERENCE TO RELATED APPLICATIONS

The present application claims priority under 37 U.S.C. § 371 to International Patent Application No. PCT/JP2019/032754, filed Aug. 22, 2019, which claims priority to and the benefit of Japanese Patent Application No. 2018-172779, filed Sep. 14, 2018. The contents of these applications are hereby incorporated by reference in their entireties.

TECHNICAL FIELD

The present invention relates to an information processing device and an information processing system that perform information processing related to the travel of a moving body.

BACKGROUND ART

In recent years, consideration has been made to information processing systems that store vehicle probe information in the server and that utilize the stored vehicle probe information for various big data analyses, e.g. analysis on the required time for each road section or analysis on traffic congestion status. The information processing systems are configured so that more accurate vehicle position information can be obtained using the global positioning system and the map matching technology.

Known as this type of information processing system is a navigation information system that utilizes only highly reliable probe information without storing unnecessary probe information in the server (see, e.g. Patent Document 1). According to the navigation information system of Patent Document 1, it is possible at the traffic information center to create map information including road characteristic evaluation based on highly reliable probe information from vehicles.

CITATION LIST

Patent Literature

Patent Document 1: Japanese Laid-Open Patent Publication No. 2007-179373

SUMMARY OF INVENTION

Technical Problem

By the way, probe information is stored in the server from various types of devices mounted on the vehicle, and therefore information with low position accuracy may be contained depending on the device type, etc. In consequence, it was difficult for the conventional information processing systems to obtain data with sufficiently high position accuracy as an object for data analyses as above for example.

An object of the present invention is to provide an information processing system capable of obtaining data with higher position accuracy from travel history information such as map-matched probe information.

Solution to Problem

An information processing device according to the present invention processes information on position coordinates of a moving body. The information processing device includes a storage and a controller. The storage stores travel history information including a series of position coordinates indicative of a travel history of the moving body. The controller performs map matching that corrects the position coordinates onto a road network of map information. The controller calculates a plurality of candidate coordinate sequences in which position coordinates as a result of the map matching are arranged, based on the travel history information stored in the storage. Afterward, the controller generates position data indicative of a position where the moving body was traveling, based on the plurality of candidate coordinate sequences calculated.

Advantageous Effects of Invention

According to the information processing device of the present invention, position data with higher reliability can be obtained based on a plurality of candidate coordinate sequences for the travel history information as the object.

BRIEF DESCRIPTION OF DRAWINGS

FIG. 7 is a view for explaining a data structure of an index file generated by the map matching candidate calculation.

FIG. 8 is a view for explaining a data structure of a candidate coordinate sequence file generated by the map matching candidate calculation.

DESCRIPTION OF EMBODIMENTS

Figure 1:
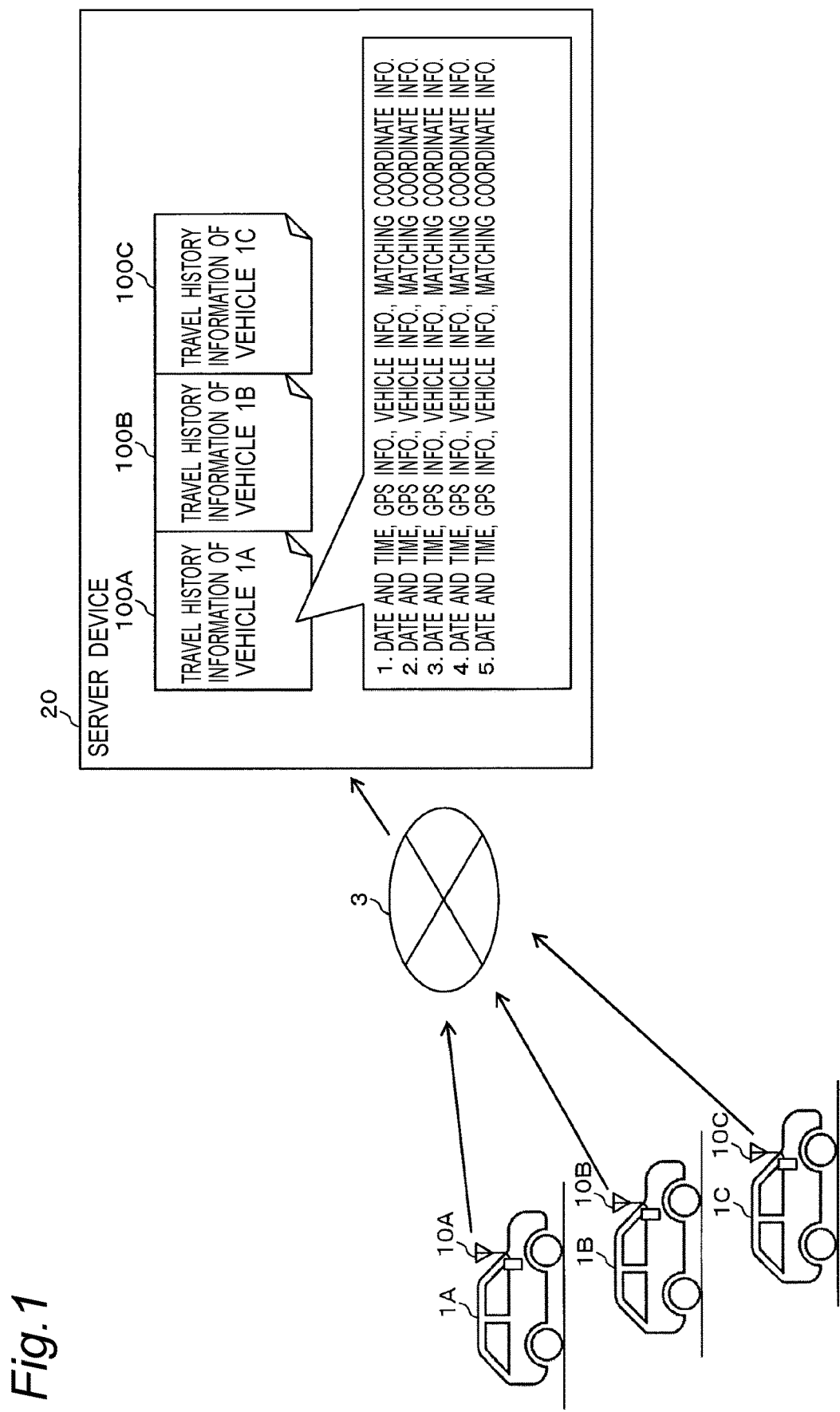
FIG. 1 is a view for explaining an outline of an information processing system according to a first embodiment.

An information terminal according to embodiments will now be described with reference to the accompanying drawings. In each of the following embodiments, the same reference numerals are imparted to like elements.

First Embodiment

In a first embodiment, referring to FIGS. 1 to 10, description will be given of an information processing system that generates reliable position data with higher position accuracy from travel history information.

FIG. 1 is a view for explaining an outline of the information processing system according to the first embodiment. The information processing system of the first embodiment includes a plurality of information terminals 10A to 10C and a server device 20. The server device 20 is an example of an information processing device. For example, the information terminals 10A to 10C are navigation devices and the server device 20 is a cloud server device. The information terminals 10A to 10C are mounted on vehicles 1A to 1C, respectively. The vehicles 1A to 1C are examples of moving bodies. Hereinafter, the information terminals 10A to 10C are collectively referred to also as "information terminal 10". The vehicles 1A to 1C are collectively referred to also as "moving body 1". The information terminal 10 performs information communication with the server device 20 via a network 3 such as the Internet. In FIG. 1, flows of information communication via the network 3 are indicated by arrows.

The information terminals 10A to 10C acquire travel history information 100A to 100C of the vehicles 1A to 1C, respectively. The travel history information 100A to 100C is information indicating, with time, the position and direction in which the vehicles 1A to 1C have traveled. Hereinafter, the travel history information 100A to 100C is collectively referred to also as "travel history information 100".

Each information terminal 10 transmits the acquired travel history information 100 to the server device 20. The server device 20 stores at any time the travel history information 100 received from each information terminal 10. Various data such as the travel history information 100 stored in the server device 20 can be used for various analyses as big data for example.

Each information terminal 10 utilizes GPS (Global Positioning System) to detect a traveling position of each moving body 1. At this time, position coordinates indicative of the position of each moving body 1 may be corrected onto a road network by using a map matching technique. The accuracy of the corrected position coordinates, however, depends on the performance of each information terminal 10. Accordingly, in case that the server device 20 stores the travel history information 100 from the information terminal 10 with a low performance, the reliability as an analysis object of the big data may possibly be impaired. There is also a case where only information from GPS or various sensors of the information terminal 10 is received as raw data that is not particularly corrected by the map matching technology. In such a case, there is also a problem that the position where the moving body 1 has traveled cannot be specified for a place where the GPS accuracy is poor. Thus, the information processing system of the present embodiment performs map matching subsequently, based on the stored travel history information 100, to thereby generate position data 223 with higher reliability in position accuracy. A configuration of the above information processing system will be described below.

Figure 2:
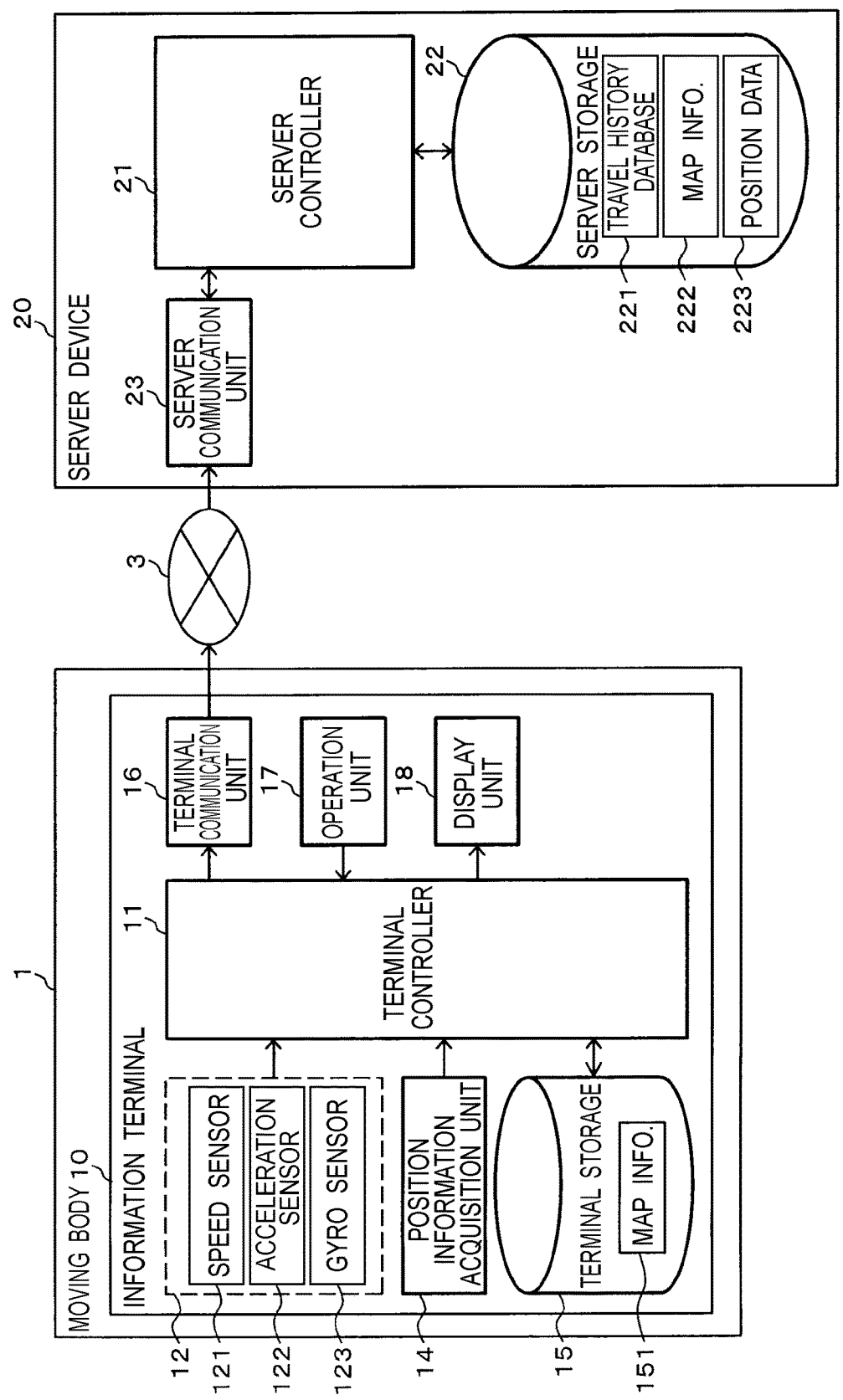
FIG. 2 is a view showing a configuration of the information processing system.

FIG. 2 is a view showing a configuration of the information processing system according to the present embodiment. As described above, the information processing system includes the information terminal 10 and the server device 20.

(Information Terminal)

Referring to FIG. 2, the information terminal 10 in the information processing system will be described.

The information terminal 10 includes a terminal controller 11, a group of various sensors 12 mounted on the moving body 1, and a position information acquisition unit 14. The information terminal 10 includes a terminal storage 15, a terminal communication unit 16, an operation unit 17, and a display unit 18.

The terminal controller 11 is configured including, for example, a CPU (Central Processing Unit) that implements a predetermined function in cooperation with software. The terminal controller 11 controls operations of the information terminal 10. The terminal controller 11 reads data and programs stored in the terminal storage 15, to perform various arithmetic processes to implement the predetermined function.

The terminal controller 11 may be composed of a hardware circuit such as a dedicated electronic circuit designed so as to implement the predetermined function or a reconfigurable electronic circuit. The terminal controller may be composed of various semiconductor integrated circuits such as CPU, GPU, MPU, microcomputer, DSP, FPGA, and ASIC.

The sensor group 12 acquires movement information such as the traveling speed of the moving body 1 or the acceleration or angular velocity applied to the moving body 1. The sensor group 12 includes, for example, a speed sensor 121, an acceleration sensor 122, a gyro sensor 123, and the like. The speed sensor 121 detects the traveling speed of the moving body 1 mounted with the information terminal 10. The acceleration sensor 122 detects the acceleration applied to the moving body 1. The gyro sensor 123 detects the angular velocity applied to the moving body 1. The sensor group 12 of the present embodiment acquires movement information in a cycle of 200 ms. The sensor group 12 may include an acquisition unit that acquires various pieces of information about the moving body 1 from various ECUs (Electronic Control Units) in the moving body 1.

The position information acquisition unit 14 acquires position information indicating the current position of the information terminal 10. In the present embodiment, the position information acquisition unit 14 is a GPS module that receives radio waves from GPS satellites to measure the latitude and longitude of the received point. The position information acquisition unit 14 of the present embodiment acquires GPS information in a cycle of 1000 ms.

The terminal storage 15 is a storage medium that stores programs and data necessary for implementing functions of the information terminal 10. The terminal storage 15 has e.g. map information 151 for performing map matching in the information terminal 10. Note that the information terminal 10 need not perform map matching in particular. The map information 151 in the terminal storage 15 can be omitted as appropriate.

The terminal communication unit 16 is a module for connecting the information terminal 10 to the network 3 in accordance with a predetermined communication standard. The predetermined communication standard includes e.g. IEEE (Institute of Electrical and Electronic Engineers) 802.3, IEEE 802.11a/11b/11g/11ac, and a 3G or 4G communication standard for mobile communications. The terminal communication unit 16 transmits the travel history information 100 acquired by the information terminal 10 to the server device 20.

Here, the travel history information 100 includes the GPS information, the movement information, matching coordinate information, and information on the date and time when these pieces of information were acquired. The GPS information is information such as the position coordinates of the information terminal 10 measured using GPS. The movement information is information such as the speed, angular velocity, and acceleration of the moving body 1 such as a vehicle, measured using the sensor group 12 mounted on the information terminal 10. The matching coordinate information is position coordinate information of the moving body 1 corrected by using the map matching technique.

The operation unit 17 is a user interface via which user's various operations are input to the information terminal 10. The operation unit 17 is composed of a switch or the like. Alternatively, the operation unit 17 may make up a touch panel together with the display unit 18 described later and input a user's touch operation on various segments of the display unit 18 to the information terminal 10.

The display unit 18 is composed of e.g. a liquid crystal display or an organic EL (Electro Luminescence) display. The display unit 18 displays current position information of the information terminal 10 while superimposing it on the map information 151 stored in the terminal storage 15.
(Server Device)

The server device 20 in the information processing system will be described with reference to FIG. 2.

In FIG. 2, the server device 20 includes a server controller 21, a server storage 22, and a server communication unit 23. Here, the server controller 21 is an example of a controller, the server storage 22 is an example of a storage, and the server communication unit 23 is an example of a communication unit.

The server controller 21 is configured including e.g. a CPU that implements a predetermined function in cooperation with software. The server controller 21 controls operations of the server device 20. The server controller 21 reads data and programs stored in the server storage 22 and performs various arithmetic processes to implement a predetermined function. For example, the server controller 21 refers to map information 222 previously stored in the server storage 22, to implement a map matching function that corrects information indicating the position coordinates of the moving body 1.

The server controller 21 may be composed of a hardware circuit such as a dedicated electronic circuit designed so as to implement the predetermined function or a reconfigurable electronic circuit. The server controller 21 may be composed of various semiconductor integrated circuits such as CPU, GPU, MPU, microcomputer, DSP, FPGA, and ASIC.

The server storage 22 is a storage medium that stores programs and data necessary for implementing functions of the server device 20. The server storage 22 has a travel history database 221 and the map information 222. The travel history database 221 stores the travel history information 100 acquired from the plurality of information terminals 10. The map information 222 contains e.g. a road network composed of nodes and links, and is used for map matching. Hereinafter, the database may be abbreviated as "DB". The travel history information 100 is received by the server communication unit and stored in the server storage 22 by the server controller 21.

The server communication unit 23 is a module for connecting the server device 20 to the network 3 in accordance with a predetermined communication standard. The predetermined communication standard encompasses e.g. IEEE 802.3, IEEE 802.11a/11b/11g/11ac, and the 3G or 4G communication standard for mobile communications. The server communication unit 23 receives the travel history information 100 acquired by the information terminal 10.

Operations of the information processing system configured as described above will be described hereinbelow.

In the information processing system of the present embodiment, each information terminal 10 acquires the travel history information 100 at the time of movement and transmits it to the server device 20. The server device 20 receives the travel history information 100 at the time of movement and stores it in the travel history DB 221. Afterward, the server device 20 acquires travel history information 100 to be processed from the travel history DB 221 and performs position data processing described later on the travel history information 100 to generate the position data 223 as more reliable information. Here, the travel history information 100 to be processed is information in a predetermined area among pieces of the travel history information 100 acquired from one moving body 1.
(Position Data Processing)

Figure 3:
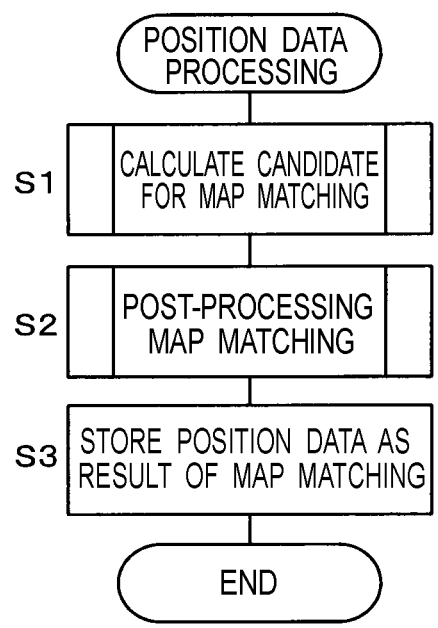
FIG. 3 is a flowchart for explaining position data processing by a server device in the information processing system.
Figure 4A:
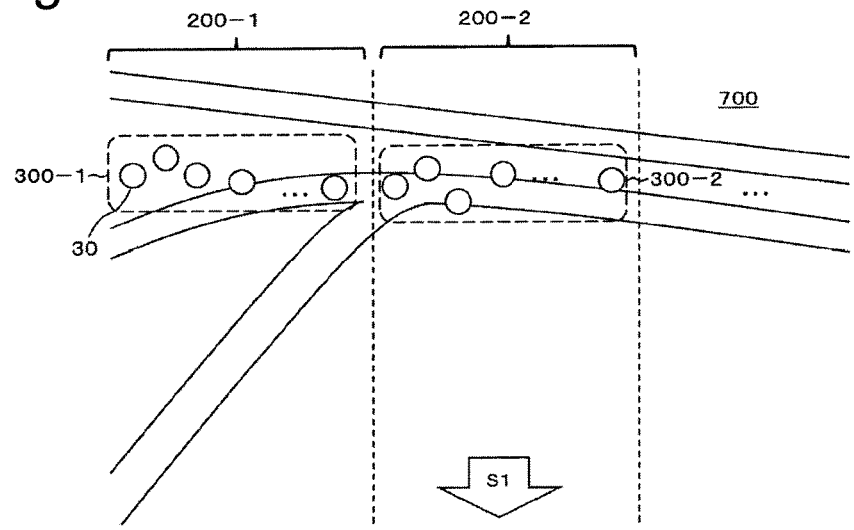
FIG. 4A is a view illustrating a road network in map information and GPS coordinates in travel history information.
Figure 4B:
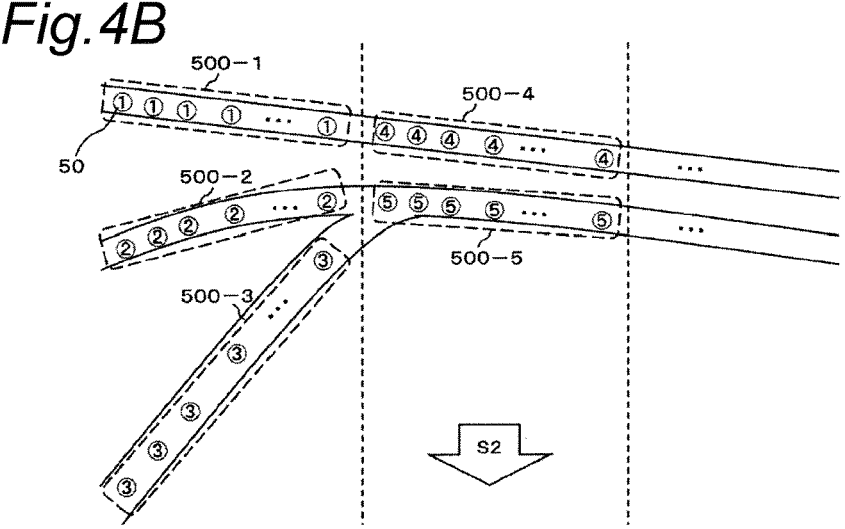
FIG. 4B a view illustrating a result of processing at step S1 based on the various pieces of information of FIG. 4A.
Figure 4C:
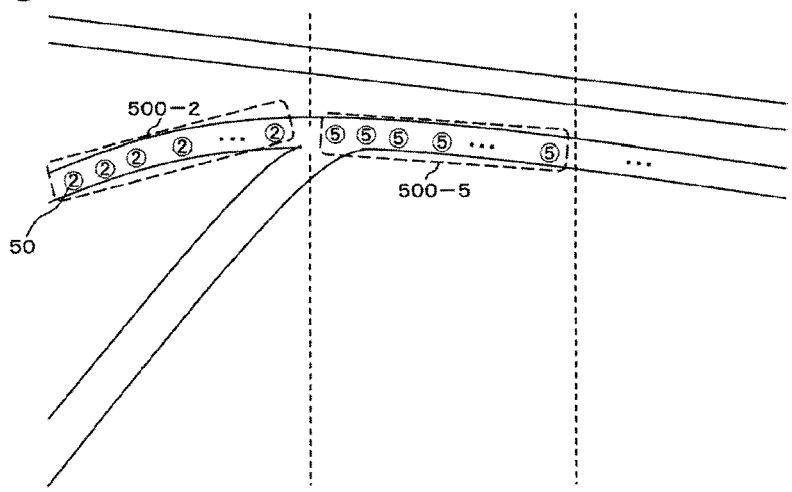
FIG. 4C is a view showing an example of post-processing map matching for FIG. 4B.

FIG. 3 is a flowchart for explaining the position data processing of the information processing system according to the first embodiment. FIGS. 4A-4C are views for exemplifying the position data processing. Hereinafter, the position data processing by the server device 20 will be described in accordance with the flowchart of FIG. 3.

First, in the position data processing of FIG. 3, the server controller 21 refers to the map information 222 stored in the server storage 22, to calculate candidate coordinates for map matching about the travel history information 100 to be processed (S1). The candidate coordinates are coordinates as candidates for the correct position coordinates with respect to GPS coordinates of the travel history information 100. An example of map matching candidate calculation (S1) is shown in FIGS. 4A and 4B.

FIG. 4A illustrates a road network 700 in the map information 222 and GPS coordinates 30 in the travel history information 100. FIG. 4B illustrates a result of processing at step S1 based on the various pieces of information of FIG. 4A.

As shown in FIG. 4A, the process at step S1 is performed for each of check sections 200-1 and 200-2 including a predetermined number of the GPS coordinates 30. The predetermined number is e.g. 20 points or 30 points. In the example of FIGS. 4A to 4C, three candidate coordinate sequences 500-1, 500-2, 500-3 are generated for a sequence 300-1 of the GPS coordinates 30 in the first check section 200-1. In the next check section 200-2, two candidate coordinate sequences 500-4 and 500-5 are generated for a GPS coordinate sequence 300-2. The candidate coordinate sequences 500-1 to 500-5 each include a plurality of candidate coordinates 50 corresponding to the GPS coordinates 30, respectively. Details of processing at step S1 will be described later.

Next, the server controller 21 executes post-processing map matching, based on the result of processing at step S1 (S2). The post-processing map matching is processing for generating the position data 223 as the correction result of the travel history information 100 by narrowing down from the plurality of candidate coordinate sequences. At step S2, the server controller 21 performs post-processing map matching so as to determine one candidate coordinate sequence as the optimum coordinate sequence for each check section, based on the candidate coordinate sequence obtained by the map matching candidate calculation. FIG. 4C shows an example of the post-processing map matching (S2) with respect to FIG. 4B.

In the example of FIGS. 4A to 4C, in one check section 200-1, one candidate coordinate sequence 500-2 is selected as a correct answer from the three candidate coordinate sequences 500-1, 500-2, and 500-3, and in the next check section 200-2, the candidate coordinate sequence 500-5 following the coordinate sequence 500-2 is selected from the two candidate coordinate sequences 500-4 and 500-5, to thereby perform the map matching. Details of processing at step S2 will be described later.

The server controller 21 generates the position data 223 by concatenating one candidate coordinate sequence for each check section determined by the above post-processing map matching (S2) and stores the position data 223 in the server storage 22 (S3) to terminate the position data processing in FIG. 3.

According to the above position data processing, a plurality of candidate coordinate sequences are generated for the travel history information 100 as the object (S1) and a coordinate sequence is selected from the plurality of candidate coordinate sequences generated (S2), whereby the position data 223 with higher reliability can be obtained. Details of the above position data processing will be described hereinbelow.

(Map Matching Candidate Calculation (S1))

Figure 5:
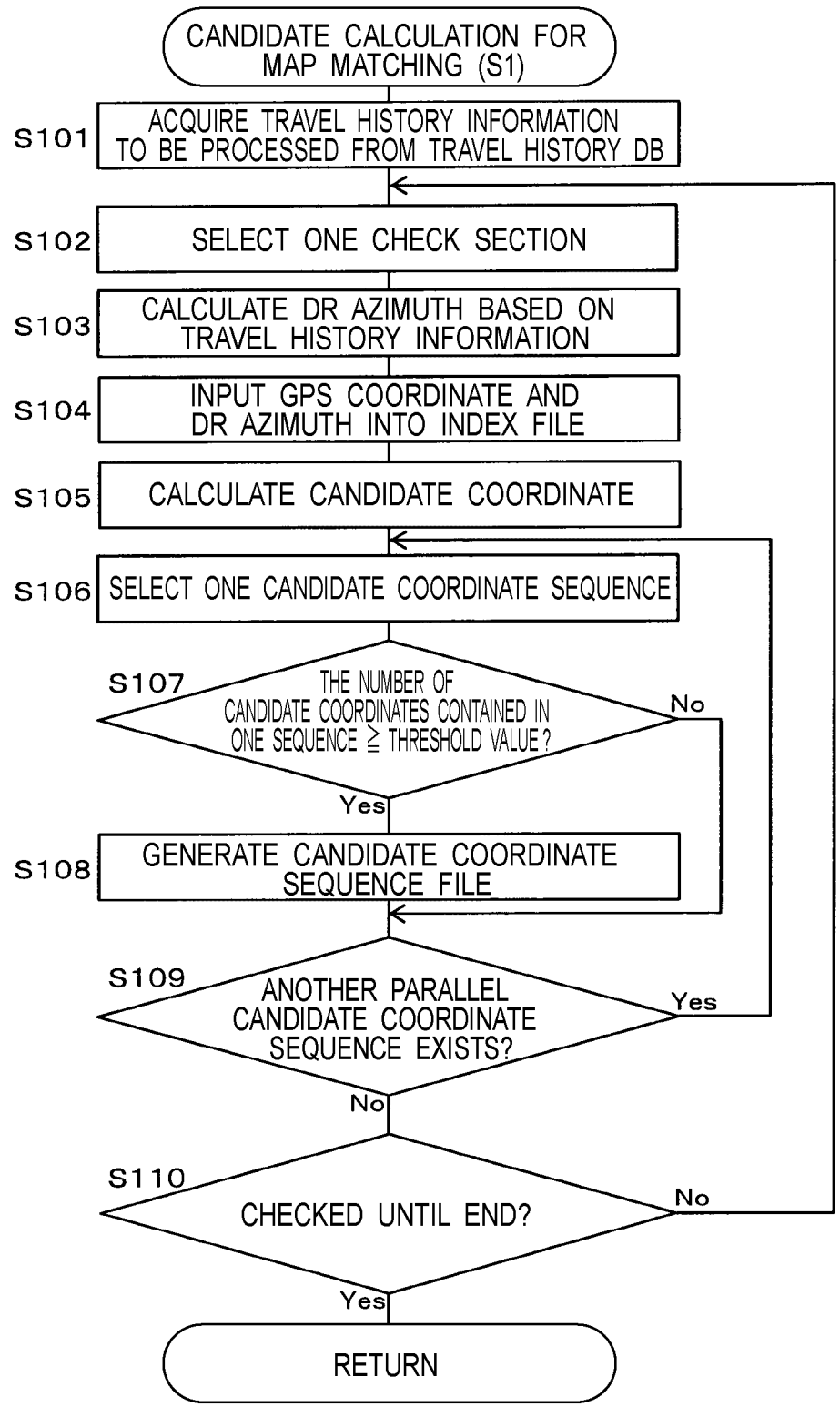
FIG. 5 is a flowchart for explaining map matching candidate calculation in the position data processing.
Figure 6:
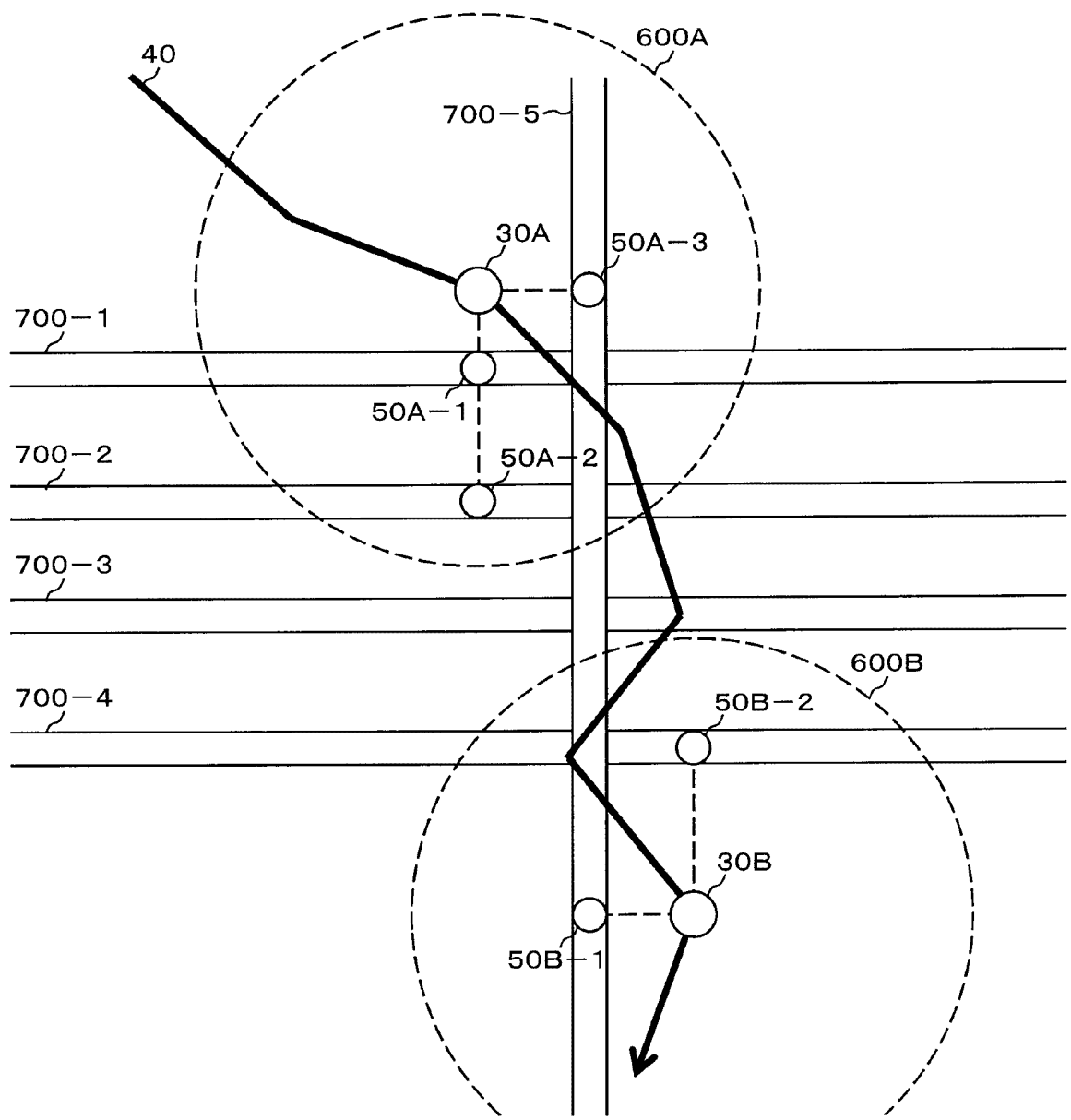
FIG. 6 is a view for explaining the map matching candidate calculation.

Details of the process at step S1 in FIG. 3 will be described below. FIG. 5 is a flowchart for explaining the map matching candidate calculation (S1). FIG. 6 is a view for explaining a method for calculating candidate coordinates in the map matching. Hereinafter, description will be given along the flowchart of FIG. 5.

In this processing, the server controller 21 reads the travel history information 100 to be processed in the travel history DB 221, sequentially from the beginning to the end in the traveling direction of the moving body 1, to generate a plurality of candidate coordinate sequences.

First, the server controller 21 acquires the travel history information 100 to be processed for map matching from the travel history DB 221 (S101). The travel history information 100 to be processed contains GPS information and movement information for a multiplicity of check sections that correspond to the history obtained when a specific moving body 1 such as one vehicle 1A has traveled in the past.

The server controller 21 then selects one check section in the acquired travel history information 100 (S102). The check section of the present embodiment is sequentially selected from the beginning to the end of the acquired travel history information 100. The server controller 21 reads the GPS information and the movement information of the travel history information 100 for the selected check section. Since the information terminal 10 of the present embodiment acquires the GPS information in a cycle of 1000 ms and acquires the movement information in a cycle of 200 ms, for example, the travel history information 100 for one GPS coordinate point contains the movement information updated five times.

The server controller 21 then calculates the azimuth based on autonomous navigation from the movement information of the read travel history information 100 (S103). Hereinafter, the azimuth based on autonomous navigation is referred to also as "DR (Dead Reckoning) azimuth".

The server controller 21 then associates the read GPS coordinates with the calculated DR azimuth and records them in an index file (S104). The index file is a file for managing the travel history information 100 acquired as the processing object. FIG. 7 is a view for explaining a data structure of the index file.

Input into the index file, as shown in FIG. 7 for example, are the GPS information index number, the movement information index number, the GPS coordinates read from the GPS information, and the DR azimuth calculated from the movement information. The server controller 21 assigns the GPS information index number in ascending order for each piece of GPS information for one coordinate point and assigns the movement information index number in ascending order for each piece of movement information.

The server controller 21 calculates candidate coordinates in the selected check section, based on the travel history information 100 and the map information 222 (S105). For example, the server controller 21 calculates at least one candidate coordinate for one GPS coordinate point. The candidate coordinates calculated at step S105 are illustrated in FIG. 6.

At step S105, the server controller 21 corrects a reference position such as GPS coordinates in the travel history information 100 by the movement information, to create an estimated position 40 as shown in FIG. 6. The estimated position 40 is a position through which the moving body 1 is estimated to have passed in the check section. The server controller 21 generates candidate coordinates by searching the road network 700 within a range of a predetermined area 600 from the estimated position 40. The predetermined area 600 is an area indicating the vicinity of the estimated position 40 in accordance with various assumed types.

In the example of FIG. 6, the server controller 21 generates candidate coordinates 50A-1, 50A-2, and 50A-3 on road networks 700-2 and 700-5, respectively, adjacent to a GPS coordinate 30A in a predetermined area 600A. The server controller 21 generates candidate coordinates 50B-1 and 50B-2 on a road network 700-4 and the road network 700-5, respectively, adjacent to a GPS coordinate 30B in a predetermined area 600B.

As described above, in the process at step S105, a plurality of candidate coordinates can be calculated for each point. Therefore, as shown in FIG. 4B for example, a plurality of candidate coordinate sequences 500 can be configured in the same check section 200. Based on the road network 700 for example, the server controller 21 manages a plurality of calculated candidate coordinates for each candidate coordinate sequence and holds them in a holding area of the server storage 22.

Returning to FIG. 5, the server controller 21 selects one candidate coordinate sequence from among the held candidate coordinate sequences (S106). For one candidate coordinate sequence among the held candidate coordinate sequences, the server controller 21 determines whether the number of candidate coordinates contained in the candidate coordinate sequence is equal to or more than a predetermined threshold value (S107). The threshold value is set to, for example, 20 GPS coordinates in the check section.

If the number of candidate coordinates contained in the selected candidate coordinate sequence is equal to or greater than the predetermined threshold value (Yes at S107), the server controller 21 generates a candidate coordinate sequence file for that candidate coordinate sequence (S108). On the other hand, if the number of candidate coordinates contained in the selected candidate coordinate sequence is less than the predetermined threshold value (No at S107), the server controller 21 does not generate the candidate coordinate sequence file for that candidate coordinate sequence.

Next, if there is another candidate coordinate sequence parallel to the candidate coordinate sequence (Yes at S109), the server controller 21 selects the another candidate coordinate sequence (S106) and performs the subsequent processing. The server controller 21 deletes the selected candidate coordinate sequence from the holding area of the server storage 22 and performs the determination at step S106, based on the information remaining in the holding area.

On the contrary, if there is not another candidate coordinate sequence parallel to the selected candidate coordinate sequence (No at S109) and if the end of the travel history information 100 has not been reached (No at S110), the server controller 21 selects the next check section and performs the subsequent processing (S102). If the end of the travel history information 100 has been reached (Yes at S110), the server controller 21 terminates the process at step S1 of FIG. 3 and proceeds to step S2.

According to the above processing, a plurality of candidate coordinate sequence files are generated for the traveling history information 100 to be processed. An example of the candidate coordinate sequence file is shown in FIG. 8.

FIG. 8 is a view for explaining a data structure of the candidate coordinate sequence file generated by the map matching. In order from the left column, the GPS information index numbers, the movement information index numbers, and the calculated candidate coordinates have been input into the candidate coordinate sequence file. At least one candidate coordinate sequence file is generated for each check section (S108). In the case of FIG. 4B for example, in the check section 200-1, files of the candidate coordinate sequences 500-1, 500-2, and 500-3 are generated as three candidate coordinate sequence files. In the check section 200-2, files of the candidate coordinate sequences 500-4 and 500-5 are generated as two candidate coordinate sequence files.

The post-processing map matching (S2 of FIG. 3) will be described below in which one coordinate sequence is determined for each check section from the candidate coordinate sequences generated as described above.

(Post-Processing Map Matching (S2))

Figure 9:
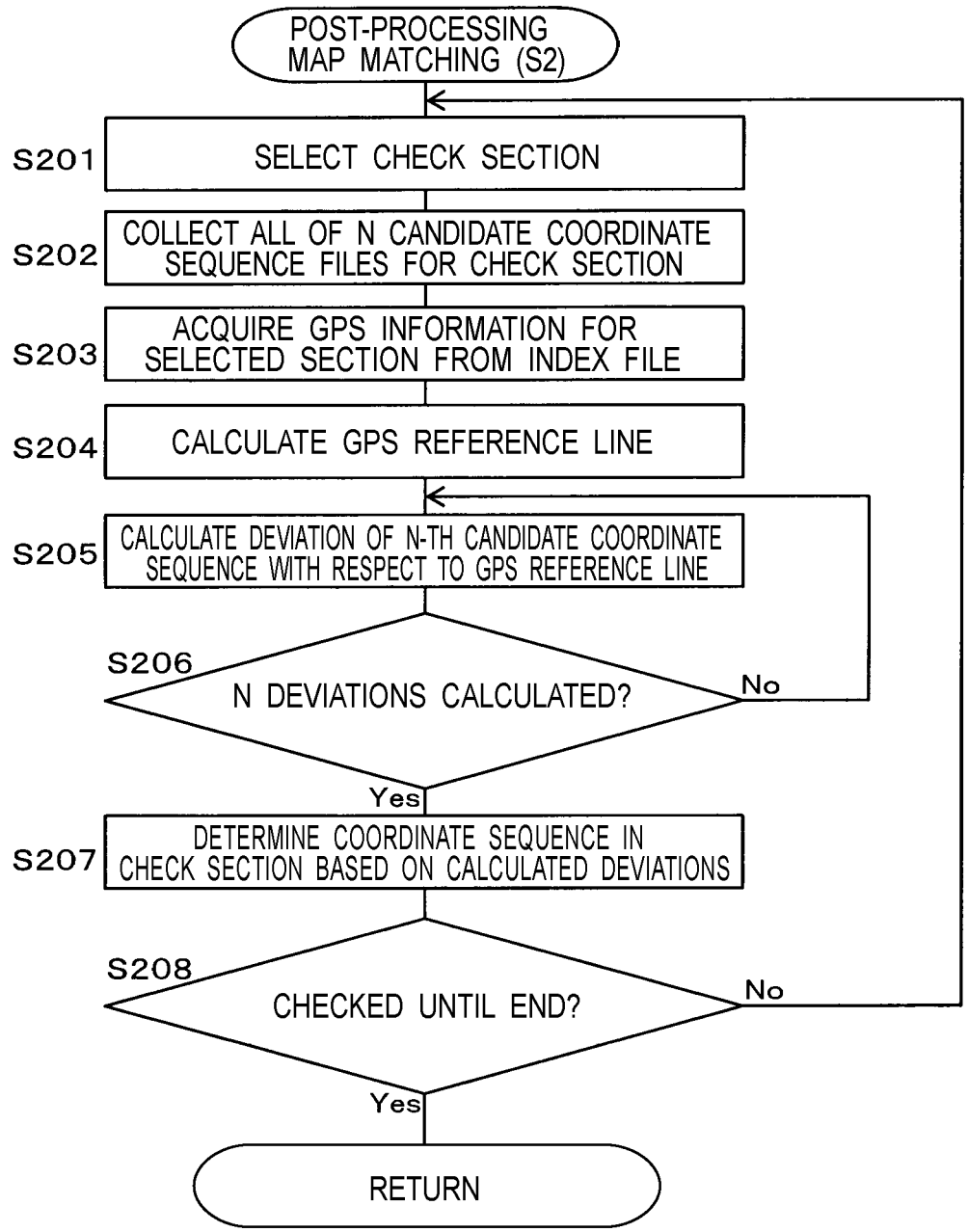
FIG. 9 is a flowchart for explaining post-processing map matching according to the first embodiment.
Figure 10:
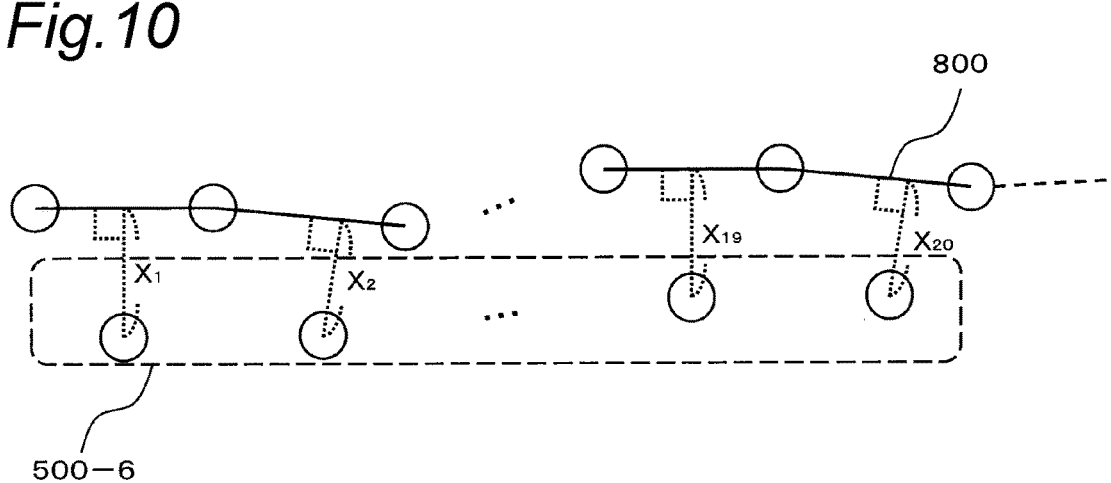
FIG. 10 is a view for explaining the post-processing map matching according to the first embodiment.

In the post-processing map matching (S2 at FIG. 3) in the present embodiment, the coordinate sequence is determined based on GPS information. FIG. 9 is a flowchart for explaining the post-processing map matching. FIG. 10 is a view for explaining the post-processing map matching. Hereinafter, the post-processing map matching will be described in accordance with the flowchart of FIG. 9.

First, the server controller 21 refers to the index file obtained at step S1 of FIG. 3 for example, to select one check section in the travel history information 100 (S201). For example, the server controller 21 selects one check section sequentially from the first section to the last section.

Next, from the candidate coordinate sequence files generated by the map matching candidate calculation (S1 in FIG. 3), the server controller 21 collects all of the candidate coordinate sequence files in the check section (S202). Hereinafter, let the number of candidate coordinate sequence files in a check section be "N". The value of the number N can change for each check section.

The server controller 21 then acquires GPS information for the selected check section from the index file (S203). The acquired GPS information contains GPS information for that section.

Next, based on the acquired GPS information, the server controller 21 calculates a GPS reference line formed by joining each GPS coordinate with a straight line (S204). The GPS reference line is a line serving as a reference for determining a coordinate sequence from the candidate coordinate sequences in the present embodiment.

Subsequently, based on the deviation between each collected candidate coordinate sequence and the GPS reference line, the server controller 21 determines a coordinate sequence in the selected check section (S205 to S207). For example, for an n-th candidate coordinate sequence file out of N, the server controller 21 calculates a deviation of each candidate coordinate of the candidate coordinate sequence with respect to the GPS reference line (S205). Specific examples of steps S204 and S205 will be described with reference to FIG. 10.

In the example of FIG. 10, the server controller 21 performs a linear interpolation between 20 GPS coordinates included in one section, to calculate a GPS reference line 800 (S204). In the example of FIG. 10, a perpendicular line can be defined from each of the 20 candidate coordinates constituting a candidate coordinate sequence 500-6 to the GPS reference line 800. The server controller 21 calculates each of lengths $X_1$ to $X_{20}$ of the perpendicular lines and totals the lengths $X_1$ to $X_{20}$ of each perpendicular line. An average value is obtained by dividing the total value by the number of candidate coordinates. The server controller 21 calculates the average value as a deviation of the candidate coordinate sequence 500-6 with respect to the GPS reference line 800.

Returning to FIG. 9, the server controller 21 calculates deviations for the candidate coordinate sequence files in ascending order from the first to the N-th (No at S205 and S206). When the deviations for the N candidate coordinate sequence files are calculated (Yes at S206), the server controller 21 determines a coordinate sequence in the selected check section, based on the calculated deviations (S207). Specifically, the server controller 21 determines a candidate coordinate sequence having a minimum deviation in the selected check section as the coordinate sequence in that section.

Until the selection of the check section reaches the end of the travel history information 100 to be processed (No at S208), the server controller 21 repeats the processes at steps S201 to S208.

When the check section reaches the end of the travel history information 100 (Yes at S208), the server controller 21 terminates the process at step S2 in FIG. 3, to proceed to step S3.

According to the above processing, the candidate coordinate sequence with the minimum deviation is determined as the coordinate sequence for each check section so that the position data 223 having higher reliability can be created at step S3.

As described above, the server device 20 according to the present embodiment performs information processing on the position coordinates of the moving body 1. The server device 20 includes the server storage 22 and the server controller 21. The server storage 22 stores the travel history information 100 including a series of position coordinates indicative of the travel history of the moving body 1. The server controller 21 performs map matching that corrects position coordinates onto the road network of the map information 222. Based on the travel history information 100 stored in the server storage 22, the server controller 21 calculates a plurality of candidate coordinate sequences in which map matched position coordinates are arranged. Next, based on the plurality of candidate coordinate sequences calculated, the server controller 21 generates the position data 223 indicative of a traveling position of the moving body 1 as the result of correction of the travel history information 100.

Consequently, the server device 20 generates a plurality of candidate coordinate sequences for the travel history information 100 as the object and selects a coordinate sequence from the plurality of generated candidate coordinate sequences, thereby making it possible to obtain the position data 223 with higher reliability.

In the present embodiment, the server controller 21 may perform map matching for each predetermined section such as the check section in the travel history information 100 and determine a coordinate sequence for each predetermined section from a plurality of candidate coordinate sequences, to generate the position data 223 as the correction result of the travel history information 100. In consequence, the server controller 21 generates candidate coordinate sequences in which a plurality of candidate coordinates are arranged in each section, whereby the coordinate sequence can be selected from candidate coordinate sequences having higher position accuracy than comparing individual candidate coordinates with each other.

In the present embodiment, the server controller 21 may determine the coordinate sequence, based on the deviation between the sequence of position coordinates in the travel history information and each candidate coordinate sequence 100 for each predetermined section.

In the present embodiment, the server controller 21 may further include the server communication unit 23 that communicates with the information terminal 10 mounted on the moving body 1 to acquire the travel history information 100. This enables the server controller 21 to acquire the travel history information 100 from the moving body 1.

In the present embodiment, the information processing system includes the information terminal 10 and the server device 20. The server device 20 processes information on the position coordinates of the moving body 1. The information terminal 10 may be mounted on the moving body and transmit travel history information to the information processing device. As a result, the information processing system can store the travel history information 100 from the moving body 1 into the server device 20 and generate the position data 223, based on the stored travel history information 100.

Second Embodiment

In a second embodiment, referring to FIGS. 11 to 18, an information processing system will be described that generates more reliable data by processing considering the connection between candidate coordinate sequences.

In the post-processing map matching (S2 in FIG. 3), the server device 20 of the first embodiment determined the coordinate sequence from the candidate coordinate sequence, based on the deviation of each candidate coordinate sequence with respect to the GPS reference line. On the contrary, the server device 20 of the present embodiment determines the coordinate sequence from the candidate coordinate sequences, based on the positional relationship between the candidate coordinate sequences included in the check sections adjacent to each other.

Figure 11:
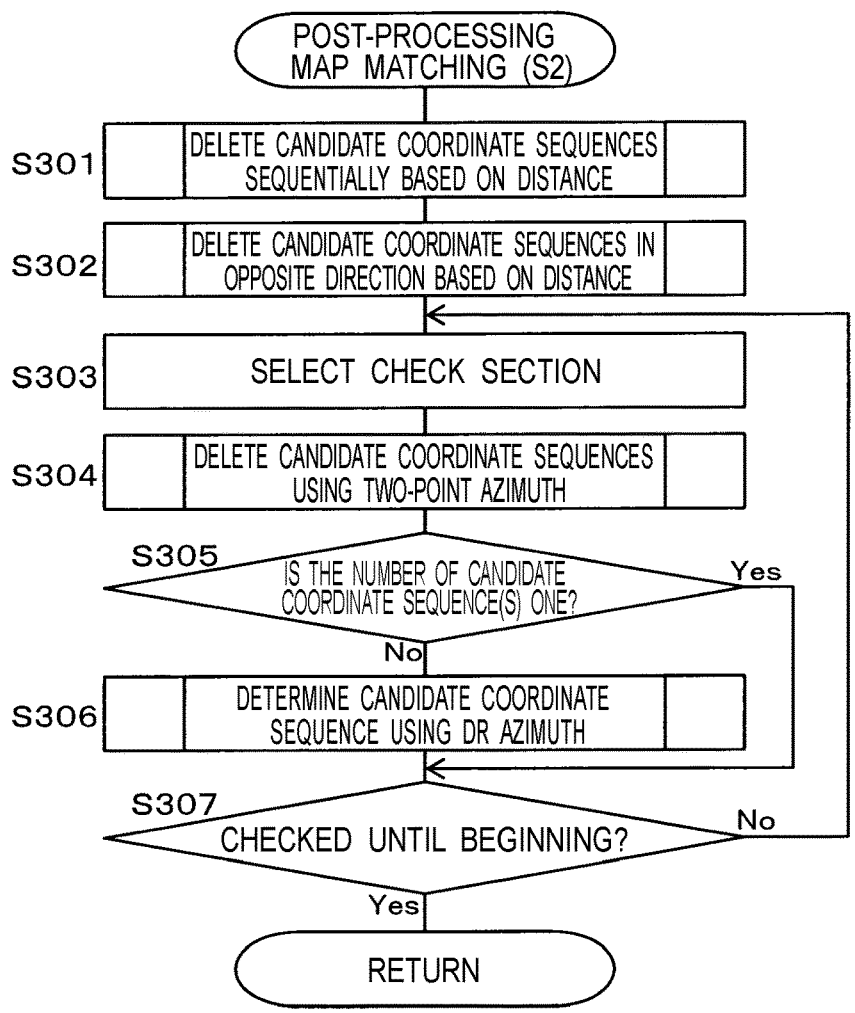
FIG. 11 is a flowchart for explaining post-processing map matching according to a second embodiment.

FIG. 11 is a flowchart for explaining post-processing map matching (S2 in FIG. 3) according to the second embodiment.

The server controller 21 of the present embodiment sequentially selects the check sections and deletes the candidate coordinate sequences included in the selected check section, based on the distance from the candidate coordinate sequence included in the immediately preceding section (S301). Here, the immediately preceding section is a section adjacent to the check section and located immediately anterior to the check section.

Next, the server controller 21 selects the check sections in the opposite direction and deletes the candidate coordinate sequences included in the selected check section, based on the distance from the candidate coordinate sequence included in the immediately succeeding section (S302). According to the processes at steps S301 and S302, candidate coordinate sequences at positions apart from each other with less possibility to connect between adjacent check sections are excluded from the coordinate sequence candidates.

The server controller 21 then selects one check section (S303) and deletes the candidate coordinate sequences in the selected check section by using the two-point azimuth described later (S304). According to the process at step 304, candidate coordinate sequences having a large azimuth difference enough to indicate less possibility to connect between adjacent check sections are excluded from the coordinate sequence candidates.

Next, if the number of candidate coordinate sequences included in the selected check section is not one (No at S305), the server controller 21 determines the coordinate sequence from the candidate coordinate sequences of the selected check section using the DR azimuth described later (S306). On the other hand, if the number of candidate coordinate sequences included in the selected check section is one (Yes at S305), the server controller 21 determines the candidate coordinate sequence of the selected check section as the candidate coordinate sequence without deleting it in particular.

Until the selection of the check section reaches the end of the travel history information 100 (No at S307), the server controller 21 repeats the processes at steps S303 to S306.

When the check section reaches the end of the travel history information 100 (S307), the server controller 21 terminates the process at step S2 in FIG. 3 and proceeds to step S3.

According to the above processing, it is possible to connect the candidate coordinate sequences close to each other in position and derive a connection of the candidate coordinate sequences lasting longer. For example, even though there occurs a temporary deterioration in the GPS accuracy, the influence of the GPS accuracy is easily suppressed in the final position data 223. Furthermore, the connections between the candidate coordinate sequences can be reflected without using information such as map data link connections, with the result that it is easy not to select a candidate coordinate sequence e.g. allowing a sudden movement from a highway to a parallel general road. Details of the above post-processing map matching will be described hereinbelow.

(Sequentially Delete Candidate Coordinate Sequences Based on Distance (S301))

Figure 12:
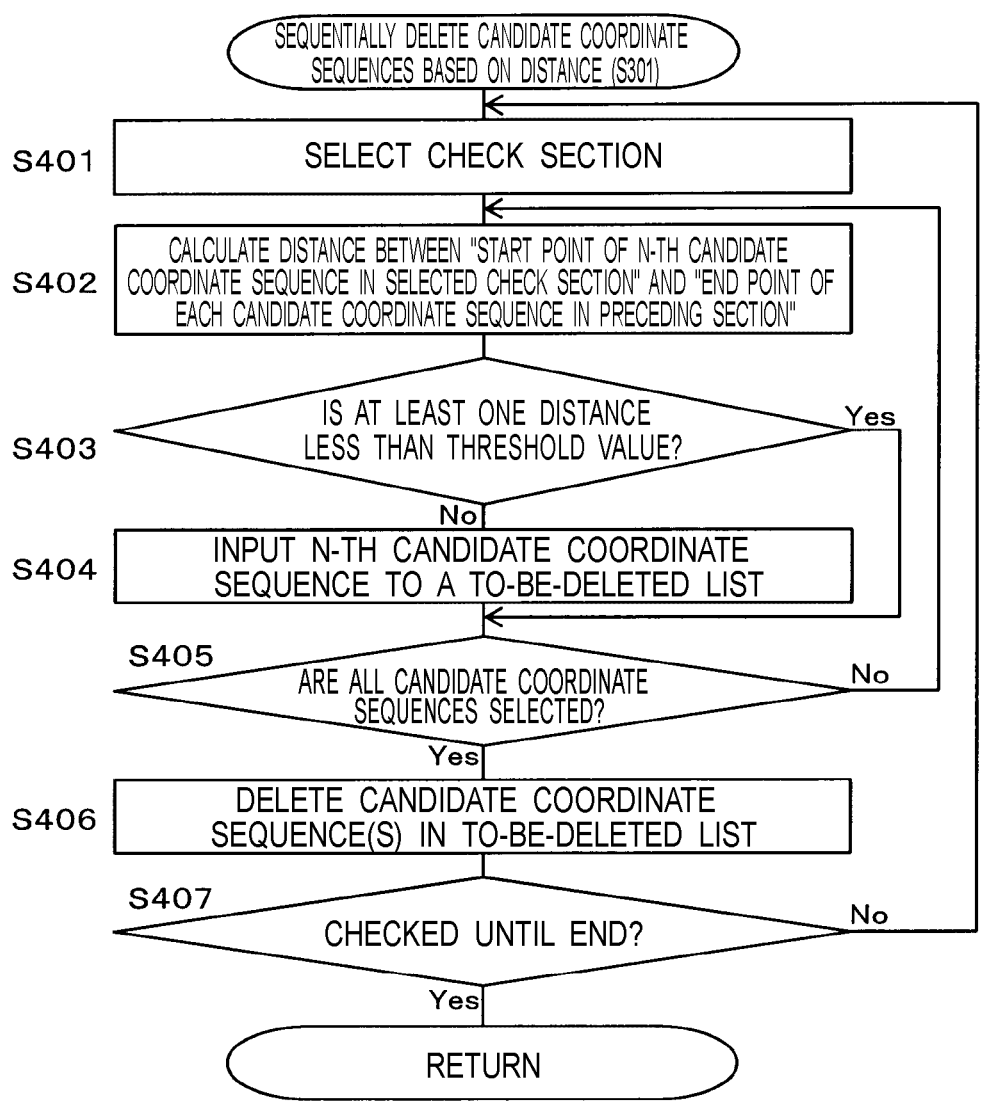
FIG. 12 is a flowchart for explaining processing of sequentially deleting candidate coordinate sequences based on the distance in the post-processing map matching.

FIG. 12 is a flowchart for explaining a process (S301 in FIG. 11) of sequentially deleting the candidate coordinate sequences based on the distance. FIGS. 13A to 13D are views for explaining the process. Hereinafter, the process by the server device 20 will be described along the flowchart of FIG. 12.

First, the server controller 21 refers to the index file obtained at step S1 in FIG. 3 for example, to select one check section in the travel history information 100 (S401). For example, the server controller 21 selects one check section sequentially from the next section at the beginning to the end section.

The server controller 21 then calculates the distance between start point coordinates of each candidate coordinate sequence in a selected check section and end point coordinates of each candidate coordinate sequence in a section immediately anterior to the check section (S402).

Figure 13A:
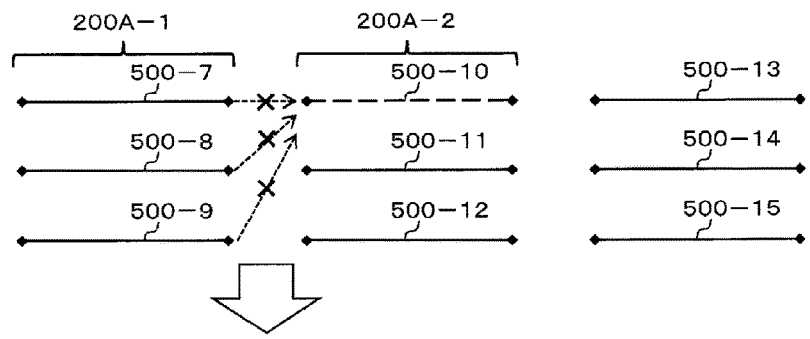
FIG. 13A is a view illustrating processes at S402 to S405 in the processing of sequentially deleting candidate coordinate sequences based on the distance.

The server controller 21 then determines whether at least one distance among the distances calculated at step S402 is less than the threshold value in the selected check section (S403). If all the distances are equal to or greater than the threshold value (No at S403), the server controller inputs the candidate coordinate sequence to a to-be-deleted list (S404). On the contrary, if at least one distance is less than the threshold value (Yes at S403), the server controller 21 does not input the candidate coordinate sequence to the to-be-deleted list. FIG. 13A exemplifies the processes at steps S402 to S405.

The server controller 21 calculates the distances between the start point coordinates of a candidate coordinate sequence 500-10 in a selected check section 200A-2 and the end point coordinates of each of candidate coordinate sequences 500-7, 500-8, and 500-9 in an immediately preceding check section 200A-1 (S402). The server controller 21 determines that all the distances are equal to or greater than the predetermined threshold value (No at S403) and inputs the candidate coordinate sequence 500-10 to the to-be-deleted list (S404). Here, in FIGS. 13A to 13D, "x" designates a part where the calculated distance is equal to or more than the threshold value and "○" designates a part where the calculated distance is equal to or less than the threshold value.

Figure 13B:
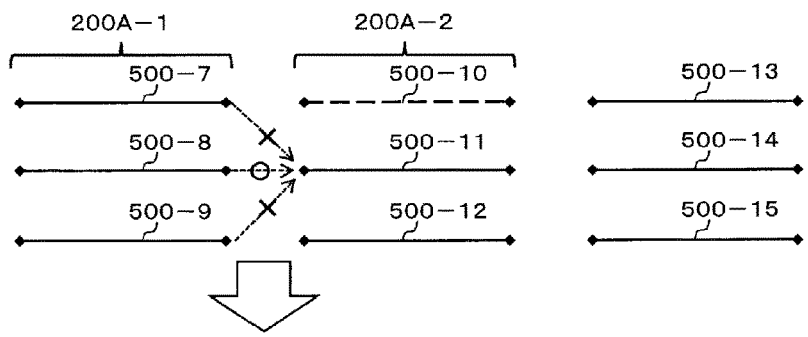
FIG. 13B is a view illustrating processes at S402 to S405 for a candidate coordinate sequence in a selected check section.
Figure 13C:
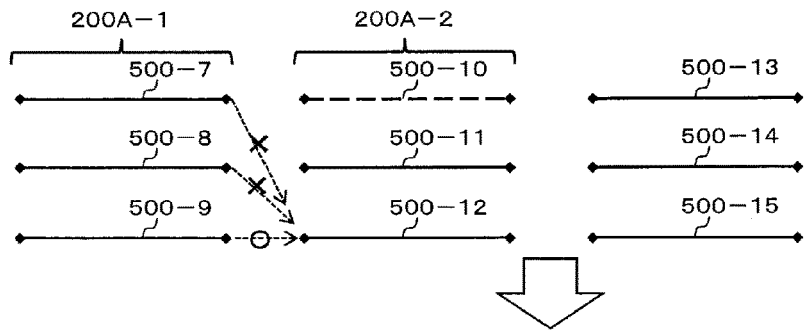
FIG. 13C is a view illustrating processes at S402 to S405 for a candidate coordinate sequence different from FIG. 13B.

Until all the candidate coordinate sequences are selected in the selected check section (No at S405), the server controller 21 repeats the processes of steps S402 to S405. FIGS. 13B and 13C illustrate the processes at steps S402 to S405 for the candidate coordinate sequences 500-11 and 500-12, respectively, different from the candidate coordinate sequence 500-10 in the selected check section.

As shown in FIG. 13B, the server controller 21 determines that the distance between the start point coordinates of the candidate coordinate sequence 500-11 and the candidate coordinate sequence 500-8 is less than the predetermined threshold value (Yes at S403) and does not input the candidate coordinate sequence 500-11 to the to-be-deleted list.

As shown in FIG. 13C, the server controller 21 determines that the distance between the start point coordinates of the candidate coordinate sequence 500-12 and the candidate coordinate sequence 500-9 is less than the predetermined threshold value (Yes at S403) and does not input the candidate coordinate sequence 500-12 to the to-be-deleted list.

Figure 13D:
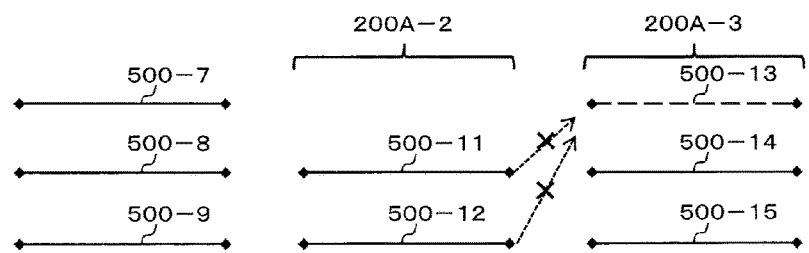
FIG. 13D is a view illustrating processing after selecting all candidate coordinate sequences in the selected check section.

When finishing selecting all the candidate coordinate sequences in the selected check section (Yes at S405), the server controller 21 deletes the candidate coordinate sequences in the to-be-deleted list (S406). FIG. 13D illustrates processing after all the candidate coordinate sequences have been selected in the selected check section 200A-2. As shown in FIG. 13D, only the candidate coordinate sequence 500-10 input to the to-be-deleted list is deleted in the selected check section 200A-2.

Until the selection of the check section reaches the end of the travel history information 100 to be processed (No at S407), the server controller 21 repeats the processing of steps S401 to S408.

In FIG. 13D, the server controller 21 selects a next check section 200A-3 (S401) and calculates the distance between "the start point of an n-th candidate coordinate sequence in the check section 200A-3" and "the end point of each candidate coordinate sequence in the immediately preceding section 200A-2" (S402), to perform subsequent processes.

When the selection of the check section reaches the end of the travel history information 100 (Yes at S407), the server controller 21 terminates the process of step S301 in FIG. 11 and proceeds to step S302.

(Delete Candidate Coordinate Sequences in Opposite Direction Based on Distance (S302))

At step S301, in case that the start point coordinates of the n-th candidate coordinate sequence in the selected check section are apart a predetermined distance or more from the end point coordinates of all the candidate coordinate sequences in the immediately preceding section, the server controller 21 deleted that candidate coordinate sequence. On the other hand, at step S302, in case that the end point coordinates of the n-th candidate coordinate sequence in the selected check section are apart a determined distance or more from the start point coordinates of all the candidate coordinate sequences in an immediately succeeding section, the server controller 21 deletes that candidate coordinate sequence. Here, the immediately succeeding section is a section adjacent to the check section and located immediately posterior to the check section. For example, the server controller 21 selects one check section in the opposite direction from the section immediately anterior to the end of the travel history information 100 up to the first section. When reaching the first check section, the server controller 21 terminates the process of step S302 in FIG. 11 to proceed to step S303.

(Delete Candidate Coordinate Sequences Using Two-point Azimuth (S304))

Figure 14:
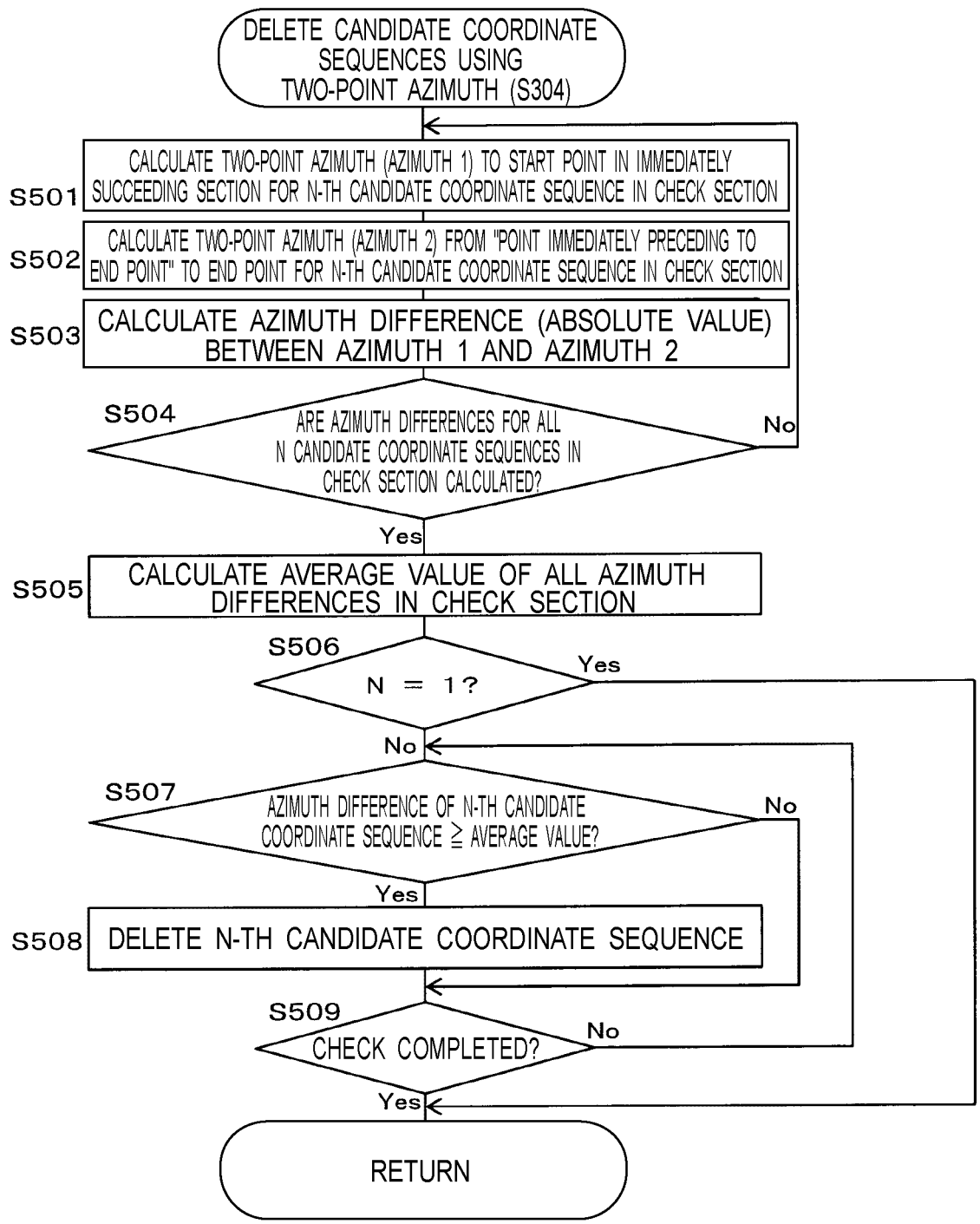
FIG. 14 is a flowchart for explaining a process of deleting candidate coordinate sequences using a two-point azimuth in the post-processing map matching.
Figure 15A:
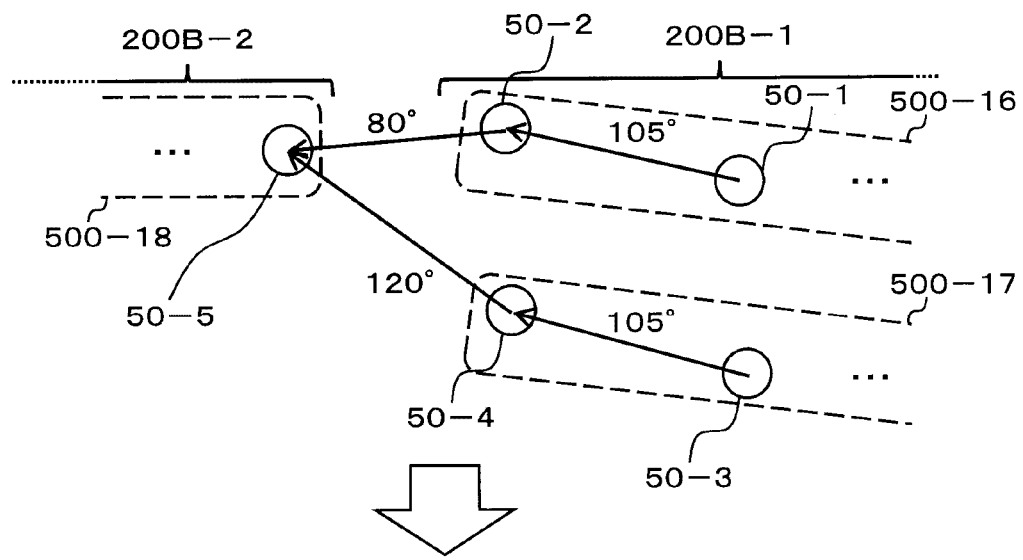
FIG. 15A is a view illustrating processes at step S501 and at step S502 for candidate coordinate sequences in a check section in the process of deleting the candidate coordinate sequences using the two-point azimuth.
Figure 15B:
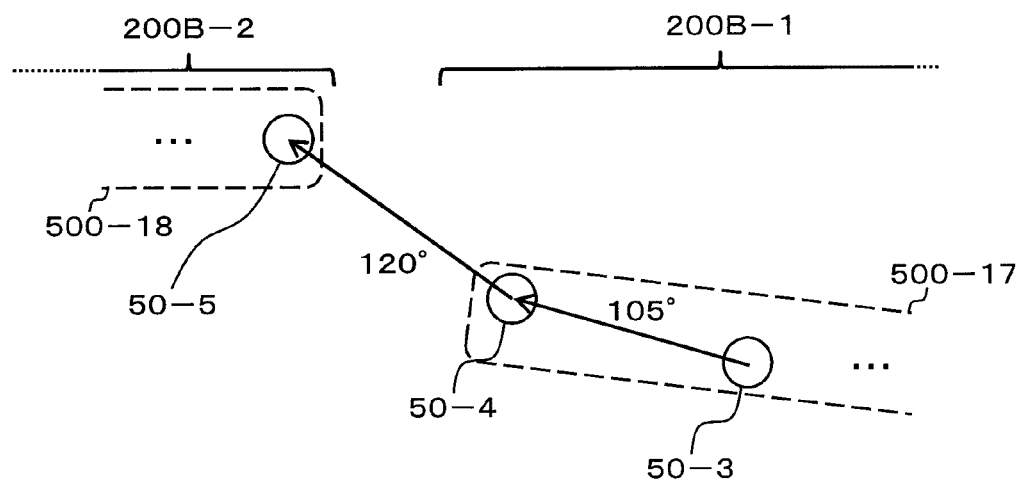
FIG. 15B is a view illustrating processes at steps S507 to S509 in the check section of FIG. 15A.

FIG. 14 is a flowchart for explaining a process (S304 in FIG. 11) of deleting candidate coordinate sequences using the azimuth between two points. FIGS. 15A and 15B are views for explaining the process. Hereinafter, the process will be described in accordance with the flowchart of FIG. 14. Note that FIG. 14 describes the process when the number of candidate coordinate sequences in the above immediately succeeding section is one. Previous to this process, one check section is selected by the server controller 21 (S303 in FIG. 11).

First, for an n-th candidate coordinate sequence in the check section, the server controller 21 calculates the azimuth to the start point coordinates of a candidate coordinate sequence in the immediately succeeding section from the end point coordinates of the n-th candidate coordinate sequence (S501). Hereinafter, the azimuth calculated at step S501 is referred to as "azimuth 1". The azimuth is an angle that increases clockwise with the north as "0°". In this case, the azimuth "90°" indicates east, "180°" indicates south, and "270°" indicates west.

FIG. 15A illustrates processes at step S501 and at step S502 described later, for candidate coordinate sequences 500-16 and 500-17 in a check section 200B-1.

The server controller 21 obtains "80°" as the azimuth 1 from end point coordinates 50-2 of the candidate coordinate sequence 500-16 to start point coordinates 50-5 of a candidate coordinate sequence 500-18 in an immediately succeeding section 200B-2.

Next, the server controller 21 calculates, in the check section, the azimuth to end point coordinates of the n-th candidate coordinate sequence from coordinates anterior to the end point coordinates (S502). Hereinafter, the azimuth calculated at step S502 is referred to as "azimuth 2".

In the example of FIG. 15A, the server controller 21 obtains "105°" as the azimuth 2 to the end point coordinates 50-2 from coordinates 50-1 anterior to the end point coordinates.

The server controller 21 then calculates the absolute value of an azimuth difference obtained by subtracting the azimuth 2 from the azimuth 1 (S503). In the example of FIG. 15A, the server controller 21 obtains "25°" as the absolute value of the azimuth difference obtained by subtracting "105°" of the azimuth 2 from "80°" of the azimuth 1.

The server controller 21 repeats the processes at steps S501 to S503 until it calculates the azimuth difference for all N candidate coordinate sequences in the check section (No at S504). In FIG. 15A, for the candidate coordinate sequence 500-17 different from the candidate coordinate sequence 500-16, the server controller 21 obtains "120°" as the azimuth 1 from end point coordinates 50-4 of the candidate coordinate sequence 500-17 to the start point coordinates 50-5 (S501). The server controller 21 then obtains "105°" as the azimuth 2 to the end point coordinates 50-4 from coordinates 50-3 anterior to the end point coordinates 50-4 (S502). The server controller 21 then obtains "15°" as the absolute value of the azimuth difference obtained by subtracting "105°" of the azimuth 2 from "120°" of the azimuth 1.

When calculating the azimuth difference for all N candidate coordinate sequences in the check section (Yes at S504), the server controller 21 calculates an average value of all the azimuth differences in the check section (S505). In FIG. 15A, the server controller 21 sums the absolute value "25°" of the azimuth difference for the candidate coordinate sequence 500-16 and the absolute value "15°" of the azimuth difference for the candidate coordinate sequence 500-17 and divides the sum by the number 2 of the candidate coordinate sequences, to obtain the average value "20°".

The server controller 21 then determines whether the number of the candidate coordinate sequences in the check section is 1 (S506). If the number of candidate coordinate sequences in the check section is not 1 (No at S506), when the azimuth difference of the n-th candidate coordinate sequence is equal to or more than the average value (Yes at S507), the server controller 21 deletes the n-th candidate coordinate sequence (S508). When the azimuth difference of the n-th candidate coordinate sequence is less than the average value (No at S507), the server controller 21 does not delete the n-th candidate coordinate sequence. The server controller 21 repeats the processes at steps S507 and S508 from 1st to N-th in ascending order (No at S509).

On the contrary, if the number of candidate coordinate sequences in the selected check section is 1 (Yes at S506), the server controller 21 does not execute the processes of steps S507 to S509.

FIG. 15B illustrates the processes at steps S507 to S509 in the check section 200B-1 of FIG. 15A. Since there are two candidate coordinate sequences in the selected check section (No at S506), the server controller 21 deletes the candidate coordinate sequence whose azimuth difference is equal to or more than the average value (S507). Specifically, the absolute value of the azimuth difference of the candidate coordinate sequence 500-16 is "25°" and the absolute value of the azimuth difference of the candidate coordinate sequence 500-17 is "15°". On the other hand, since the average value is "20°", the server controller 21 deletes the candidate coordinate sequence 500-16 having the absolute value of the azimuth difference greater than the average value.

Afterward, the server controller 21 terminates the process at step S304 of FIG. 11 and proceeds to step S305.

According to steps S301 to S304 described above, depending on the positional relationships such as the distance and the azimuth difference between candidate coordinate sequences across two adjacent sections including a check section, the candidate coordinate sequences as candidates for coordinate sequences can be restricted so as to be more likely to connect with each other.

(Determine Candidate Coordinate Sequence Using DR Azimuth (S306))

Figure 16:
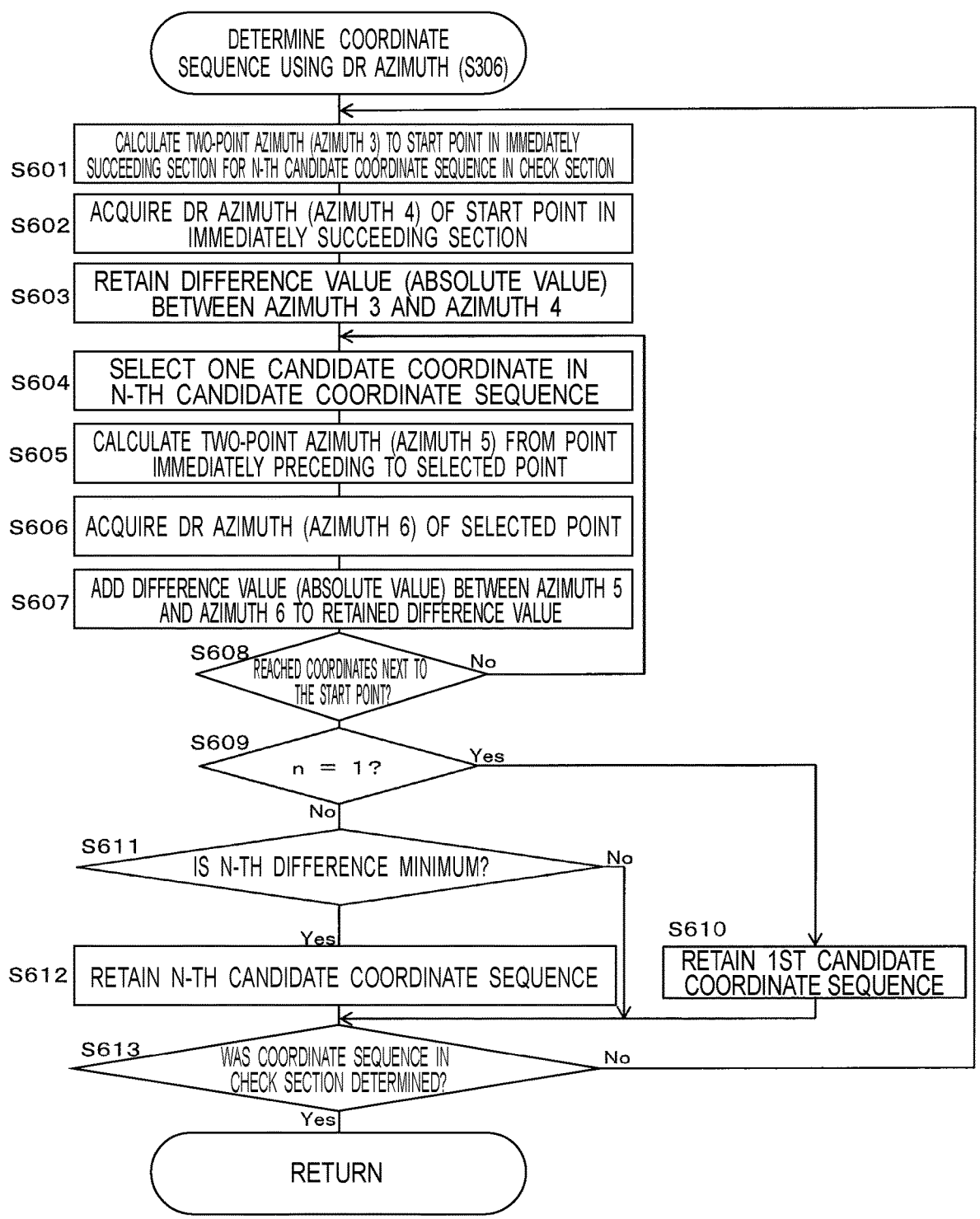
FIG. 16 is a flowchart for explaining a process of determining a candidate coordinate sequence using the DR azimuth in the post-processing map matching.
Figure 17A:
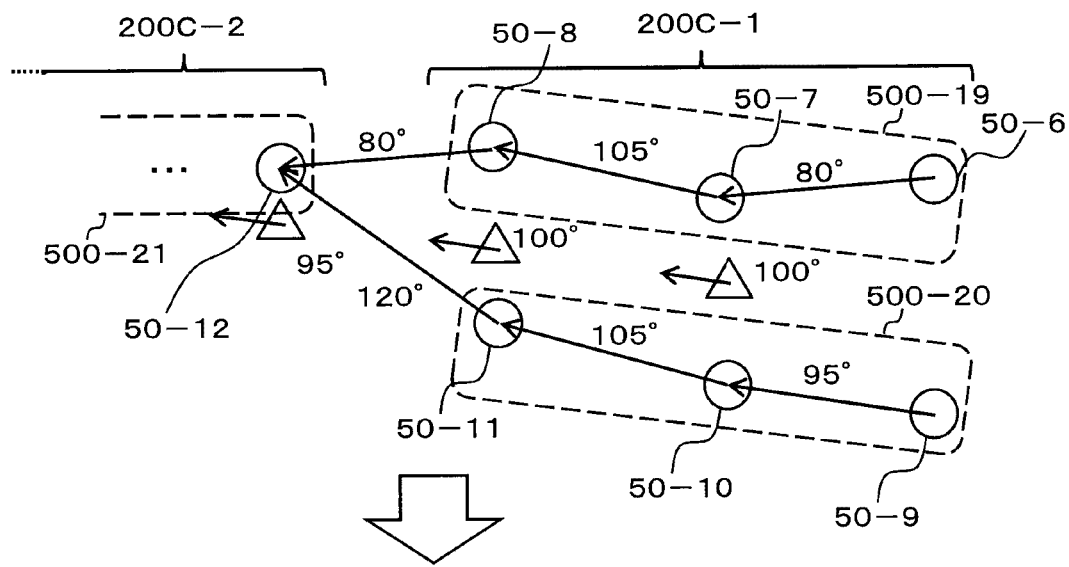
FIG. 17A is a view illustrating processes at steps S601 to S608 for candidate coordinate sequences of the check section in the process of determining a candidate coordinate sequence using the DR azimuth.
Figure 17B:
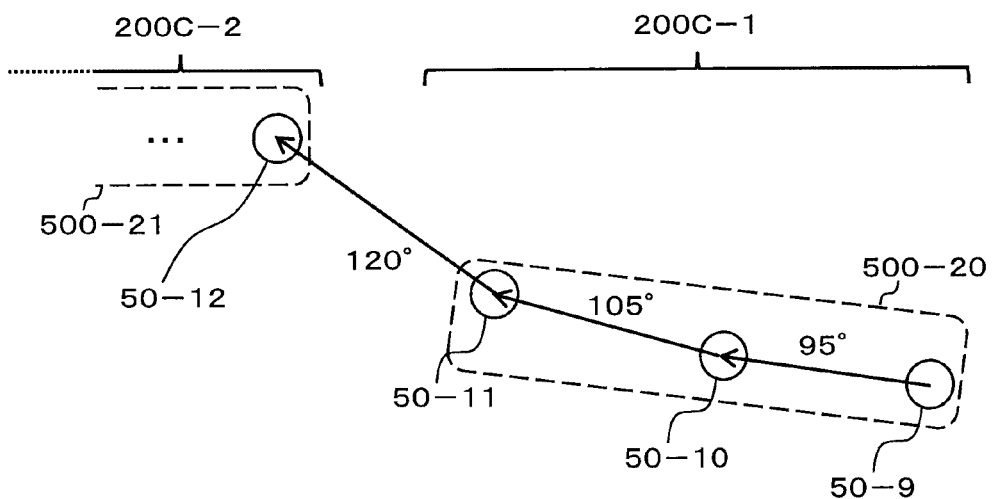
FIG. 17B is a view illustrating a result of the process of FIG. 17A of determining a candidate coordinate sequence using the DR azimuth.

FIG. 16 is a flowchart for explaining a process (S306 in FIG. 11) of determining a candidate coordinate sequence based on the DR azimuth. FIGS. 17A and 17B are views for explaining the process. Hereinafter, the process will be described along the flowchart of FIG. 16. This process is executed in case that a plurality of candidate coordinate sequences still exist (No at S305 in FIG. 11) even after the candidate coordinate sequences are deleted using the two-point azimuth in the selected check section (S304 in FIG. 11). Note that FIG. 16 explains the process in the case where the number of candidate coordinate sequences in the immediately succeeding section is 1.

First, for an n-th candidate coordinate sequence in a check section, the server controller 21 calculates the two-point azimuth from end point coordinates of the n-th candidate coordinate sequence to start point coordinates of a candidate coordinate sequence in the succeeding section (S601). Hereinafter, the azimuth calculated at step S601 is referred to as "azimuth 3". FIG. 17A exemplifies processes at steps S601 to S608 for candidate coordinate sequences 500-19 and 500-20 in a check section 200C-1.

The server controller 21 obtains "80°" as the azimuth 3 from end point coordinates 50-8 of the candidate coordinate sequence 500-19 to start point coordinates 50-12 of a candidate coordinate sequence 500-21 in an immediately succeeding section 200C-2.

The server controller 21 then acquires, from the index file, a DR azimuth of the start point coordinates of the candidate coordinate sequence in the immediately succeeding section (S602). Hereinafter, the DR azimuth acquired at steps S602 is referred to as "azimuth 4". In FIG. 17A, the server controller 21 acquires the DR azimuth "80°" of the start point coordinates 50-12 from the index file.

Next, the server controller 21 calculates a difference value between the azimuth 3 and the azimuth 4 in the n-th candidate coordinate sequence and holds its absolute value (S603). In FIG. 17A, the server controller 21 holds, as the difference value, an absolute value "15°" of a value obtained by subtracting "95°" of the azimuth 4 from "80°" of the azimuth 3 in the n-th candidate coordinate sequence 500-19.

Next, the server controller 21 selects one candidate coordinates in the n-th candidate coordinate sequence (S604) and calculates the two-point azimuth to the selected candidate coordinates from candidate coordinates immediately anterior to the selected candidate coordinates (S605). Hereinafter, the azimuth calculated at step S605 is referred to as "azimuth 5".

In FIG. 17A, the server controller 21 obtains "105°" as the azimuth 5 to the end point coordinates 50-8 from candidate coordinates 50-7 immediately anterior to the end point coordinates 508 in the candidate coordinate sequence 500-19.

The server controller 21 then acquires, from the index file, the DR azimuth of selected candidate coordinates in an n-th candidate coordinate sequence (S606). Hereinafter, the azimuth calculated at step S606 is referred to as "azimuth 6". In the example of FIG. 17A, the server controller 21 acquires "100°" as the azimuth 6 of the candidate coordinates 50-8 in the candidate coordinate sequence 500-19 from the index file.

The server controller 21 then calculates a difference value between the azimuth 5 and the azimuth 6 and adds its absolute value to the difference value of the n-th candidate coordinate sequence (S607). In FIG. 17A, the server controller 21 adds an absolute value "5°" of a value obtained by subtracting "100°" of the azimuth 6 from "105°" of the azimuth 5, to the difference value "15°", to thereby obtain "20°".

Until reaching coordinates next to the start point in the n-th candidate coordinate sequence (No at S608), the server controller 21 repeats the processes of S604 to S607. In FIG. 17A, the server controller 21 obtains "80°" as the azimuth 5 to the candidate coordinates 50-7 from candidate coordinates 50-6 anterior to the candidate coordinates 50-7 (S605) and acquires "100°" as the azimuth 6 of the candidate coordinates 50-7 from the index file (S606). The server controller 21 adds an absolute value "20°" of a value obtained by subtracting "100°" of the azimuth 6 from "80°" of the azimuth 5, to the difference value "20°", to obtain a difference value "40°" up to the end point candidate coordinates 50-9 (S607).

Next, the server controller 21 determines whether n is (S609). If n is 1, that is, if the candidate coordinate sequence with the difference value calculated at the immediately preceding processes (steps S601 to S608) is a first candidate coordinate sequence in the selected section (Yes at S609), the server controller 21 holds the first candidate coordinate sequence as a provisional coordinate sequence.

In FIG. 17A, if the candidate coordinate sequence 500-19 is the first candidate coordinate sequence, the first candidate coordinate sequence is held as the provisional coordinate sequence.

On the contrary, if n is not 1 (No at S609), the server controller 21 determines whether the difference value of an n-th candidate coordinate sequence is minimum among the difference values of the candidate coordinate sequences calculated so far (S611). If the difference value of the n-th candidate coordinate sequence is minimum (Yes at S611), the server controller 21 holds the n-th candidate coordinate sequence as the provisional coordinate sequence (S612). If the difference value of the n-th candidate coordinate sequence is not minimum (No at S611), the server controller 21 does not hold the n-th candidate coordinate sequence as the provisional coordinate sequence.

Afterward, until the coordinate sequence is determined in the check section (No at S615), the server controller 21 repeats the processes of steps S601 to S602.

In FIG. 17A, the server controller 21 obtains a difference value "35°" similarly for the candidate coordinate sequence 500-20 different from the candidate coordinate sequence 500-19 (S601 to 608). Since, if the candidate coordinate sequence 500-20 is a second candidate coordinate sequence, n is not 1 (No at S609), the server controller 21 compares the difference value "40°" of the candidate coordinate sequence 500-19 and the difference value "35°" of the candidate coordinate sequence 500-20 (S611) and holds the candidate coordinate sequence 500-20 with the minimum difference value as the provisional coordinate sequence (S612). Thereafter, since the coordinate sequence has been determined in the check section 200C-1 (Yes at S613), the server controller 21 terminates the process at step S306 in FIG. 11, to proceed to step S307.

According to the above processing, the coordinate sequence can be determined from the candidate coordinate sequences without reference to the GPS coordinates which may contain errors, so that the position data 223 with even higher reliability than the first embodiment can be created at step S3.

As above, in the present embodiment, the server controller 21 determines a coordinate sequence, based on the positional relationship between candidate coordinate sequences included in one of two sections adjacent to each other and candidate coordinate sequences included in the other. This enables the server controller 21 to determine the coordinate sequence from the candidate coordinate sequences without reference to the GPS coordinates which may contain errors, whereupon the position data 223 with even higher reliability than the first embodiment can be created at step S3.

In the present embodiment, the positional relationship between candidate coordinate sequences included in one of two sections adjacent to each other and candidate coordinate sequences included in the other may include the distance between the position coordinates adjacent to each other in the candidate coordinate sequences included in one of the two sections and the candidate coordinate sequences included in the other. As a result, depending on the distance between candidate coordinate sequences across two adjacent sections including the check section, the server controller 21 can restrict the candidate coordinate sequences to be candidates for a coordinate sequence, so as to have higher possibility to connect to each other.

In the present embodiment, the positional relationship between candidate coordinate sequences included in one of two sections adjacent to each other and candidate coordinate sequences included in the other may include the azimuth difference between the position coordinates adjacent to each other in the candidate coordinate sequences included in one of the two sections and the candidate coordinate sequences included in the other. As a result, depending on the azimuth difference between candidate coordinate sequences across two adjacent sections including the check section, the server controller 21 can restrict the candidate coordinate sequences to be candidates for a coordinate sequence, so as to have higher possibility to connect to each other.

In the present embodiment, the server controller 21 may restrict candidate coordinate sequences to be candidates for a coordinate sequence among a plurality of candidate coordinate sequences depending on the positional relationship and determine the coordinate sequence from the restricted candidate coordinate sequences, based on information indicative of the azimuth of the moving body 1 by the autonomous navigation positioning. Thus, highly reliable position data can be generated by determining the coordinate sequence depending on the difference between the azimuth of the candidate coordinate sequence and the azimuth of the moving body 1 by the autonomous navigation positioning.

In FIG. 14, as regards the process (step S304 in FIG. 11) of deleting the candidate coordinate sequences using the two-point azimuth, the case has been described where the number of candidate coordinate sequences in the immediately preceding section is 1, the number of candidate coordinate sequences in the immediately preceding section may be 2 or more. For example, in this case, for an n-th candidate coordinate sequence, the server controller 21 may add to the difference value the azimuth from the end point coordinates of each candidate coordinate sequence in the immediately précising section to the start point coordinates of the n-th candidate coordinate sequence in the check section.

In FIG. 14, as regards the process (step S304 in FIG. 11) of deleting the candidate coordinate sequences using the two-point azimuth, the azimuth difference is calculated using the start point coordinates in the immediately succeeding section, the end point coordinates in the check section, and coordinates anterior to those end point coordinates. By performing a reverse check of calculating the azimuth difference using the start point coordinates in the immediately succeeding section, the end point coordinates in the check section, and coordinates anterior to those end point coordinates, obviously unnecessary branching candidate coordinate sequences can be relatively easily deleted. Note that the process of deleting the candidate coordinate sequences using the two-point azimuth is not limited to the case of calculating the azimuth difference using the start point coordinates in the immediately succeeding section, the end point coordinates in the check section, and coordinates anterior to those end point coordinates. The process of deleting the candidate coordinate sequences using the two-point azimuth may calculate the azimuth difference using all coordinates in the immediately succeeding section, the end point coordinates in the check section, and coordinates anterior to those end point coordinates. By performing a forward check of calculating the azimuth difference using all coordinates in the immediately succeeding section, the end point coordinates in the check section, and coordinates anterior to those end point coordinates, in case that there remain many candidate coordinate sequences to merge, deletion of the candidate coordinate sequences to merge can be relatively easily performed. The process of deleting the candidate coordinate sequences using the two-point azimuth can narrow down the candidates more accurately by performing both the reverse check and the forward check.

In FIG. 16, regarding the process (step S306 in FIG. 11) of determining a coordinate sequence using the DR azimuth, the case has been described where the number of candidate coordinate sequences in the immediately preceding section is 1, the number of candidate coordinate sequences in the immediately preceding section may be 2 or more. For example, in this case, for an n-th candidate coordinate sequence, the server controller 21 may add to the difference value a difference between the azimuth from the end point coordinates of each candidate coordinate sequence in the immediately précising section to the start point of the n-th candidate coordinate sequence in the check section, and the DR azimuth of those end point coordinates.

Although the processes (steps S303 to S307 in FIG. 11) of deleting candidate coordinate sequences using the two-point azimuth and determining a coordinate sequence using the DR azimuth are executed in the reverse direction, they may be executed sequentially.

In each of the above embodiments, the server device 20 has been described as an example of the information processing device executing the position data processing. The information processing device is not limited to the server device 20, and may be e.g. a navigation device mounted on the moving body 1, such as the information terminal 10. That is, inventions of the present application may be configured by appropriately applying part of the configurations of the first embodiment and the second embodiment. Furthermore, inventions of the present application may be configured such that part of the configuration of each embodiment can be appropriately processed via a network. In other words, in inventions of the present application, the processes or the functions may be implemented through centralized processing by a single device or a single system or may be implemented through distributed processing by a plurality of devices or a plurality of systems.

REFERENCE SIGNS LIST 1 moving body
10 information terminal
11 terminal controller
20 server device
21 server controller
22 server storage

The invention claimed is:

1. An information processing device comprising a controller that processes information on position coordinates of a moving body, the controller:

performing, based on the stored travel history information including a series of position coordinates indicative of a travel history of the moving body, map matching that corrects the position coordinates onto a road network of map information, calculating a plurality of candidate coordinate sequences in which candidate coordinates as a result of the map matching are arranged, based on the travel history information, and generating position data indicative of a position where the moving body was traveling, based on the plurality of candidate coordinate sequences, wherein the controller:

performs the map matching for each predetermined section in the travel history information;

calculates the plurality of candidate coordinate sequences for each predetermined section, wherein each of the plurality of candidate coordinate sequences include a positional accuracy based on the performed map matching;

removes candidate coordinate sequences from the plurality of candidate coordinate sequences that fail to satisfy a threshold distance with any candidate coordinate sequences of an adjacent predetermined section; and for each predetermined section, determines a coordinate sequence from the plurality of candidate coordinate sequences, by comparing the positional accuracy of a first candidate coordinate sequence of a first plurality of candidate coordinate sequences associated with a first predetermined section and the positional accuracy of a second candidate coordinate sequence of a second plurality of candidate coordinate sequences associated with a second predetermined section according to a positional relationship between the first candidate coordinate sequence and the second candidate coordinate sequence to select the coordinate sequence that includes a greater positional accuracy resulting from the comparison, the first and second predetermined sections being adjacent to each other; and connects thus determined coordinate sequences of respective adjacent sections to generate the position data as correction results of the travel history information, wherein, when the controller determines the coordinate sequence, for each section, the controller:

calculates a reference line based on the series of position coordinates within the each section, calculates deviations, each of the deviations being calculated as a deviation between the reference line and each of the plurality of candidate coordinate sequences, and determines the coordinate sequence based on the deviations.

2. The information processing device of claim 1, wherein the controller determines the coordinate sequence, based on a deviation between a sequence of position coordinates in the travel history information and each of the candidate coordinate sequences for the each section.

3. The information processing device of claim 1, wherein the positional relationship includes an azimuth difference between position coordinates adjacent to each other in candidate coordinate sequences included in one of the two sections and candidate coordinate sequences included in the other.

4. The information processing device of claim 1, wherein the positional relationship includes an azimuth difference between position coordinates adjacent to each other in candidate coordinate sequences included in one of the two sections and candidate coordinate sequences included in the other.

5. The information processing device of claim 3, wherein the controller restricts candidate coordinate sequences to be candidates for the coordinate sequence in the plurality of candidate coordinate sequences, depending on the positional relationship, and determines the coordinate sequence from among the restricted candidate coordinate sequences, based on information indicative of an azimuth of the moving body by autonomous navigation positioning.

6. The information processing device of claim 1, further comprising a communication unit that communicates with an information terminal mounted on the moving body, to acquire the travel history information.

7. The information processing device of claim 3, wherein the positional relationship includes an azimuth difference between position coordinates adjacent to each other in candidate coordinate sequences included in one of the two sections and candidate coordinate sequences included in the other.

8. The information processing device of claim 4, wherein the controller restricts candidate coordinate sequences to be candidates for the coordinate sequence in the plurality of candidate coordinate sequences, depending on the positional relationship, and determines the coordinate sequence from among the restricted candidate coordinate sequences, based on information indicative of an azimuth of the moving body by autonomous navigation positioning.

9. The information processing device of claim 7, wherein the controller restricts candidate coordinate sequences to be candidates for the coordinate sequence in the plurality of candidate coordinate sequences, depending on the positional relationship, and determines the coordinate sequence from among the restricted candidate coordinate sequences, based on information indicative of an azimuth of the moving body by autonomous navigation positioning.

10. An information processing system comprising:

a storage storing travel history information including a series of position coordinates indicative of a travel history of a moving body; and a controller performing, based on the stored travel history information, map matching that corrects the position coordinates onto a road network of map information, calculating a plurality of candidate coordinate sequences in which position coordinates as a result of the map matching are arranged, based on the travel history information stored in the storage, and generating position data indicative of a position where the moving body was traveling, based on the plurality of candidate coordinate sequences, wherein the controller:

performs the map matching for each predetermined section in the travel history information;

calculates the plurality of candidate coordinate sequences for each predetermined section, wherein each of the plurality of candidate coordinate sequences include a positional accuracy based on the performed map matching;

removes candidate coordinate sequences from the plurality of candidate coordinate sequences that fail to satisfy a threshold distance with any candidate coordinate sequences of an adjacent predetermined section; and for each predetermined section, determines a coordinate sequence from the plurality of candidate coordinate sequences, by comparing the positional accuracy of a first candidate coordinate sequence of a first plurality of candidate coordinate sequences associated with a first predetermined section and the positional accuracy of a second candidate coordinate sequence of a second plurality of candidate coordinate sequences associated with a second predetermined section according to a positional relationship between the first candidate coordinate sequence and the second candidate coordinate sequence to select the coordinate sequence that includes a greater positional accuracy resulting from the comparison, the first and second predetermined sections being adjacent to each other; and connects thus determined coordinate sequences of respective adjacent sections to generate the position data as correction results of the travel history information, wherein, when the controller determines the coordinate sequence, for each section, the controller:

calculates a reference line based on the series of position coordinates within the each section, calculates deviations, each of the deviations being calculated as a deviation between the reference line and each of the plurality of candidate coordinate sequences, and determines the coordinate sequence based on the deviations.

* * * * *